United States Patent
Yan et al.

(10) Patent No.: US 12,220,988 B2
(45) Date of Patent: Feb. 11, 2025

(54) ENERGY CONVERSION APPARATUS AND VEHICLE

(71) Applicant: BYD COMPANY LIMITED, Guangdong (CN)

(72) Inventors: Lei Yan, Shenzhen (CN); Jicheng Li, Shenzhen (CN); Ye Lei, Shenzhen (CN); Feiyue Xie, Shenzhen (CN); Sijia Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 127 days.

(21) Appl. No.: 17/622,626

(22) PCT Filed: Jun. 24, 2020

(86) PCT No.: PCT/CN2020/098149
§ 371 (c)(1),
(2) Date: Dec. 23, 2021

(87) PCT Pub. No.: WO2021/000784
PCT Pub. Date: Jan. 7, 2021

(65) Prior Publication Data
US 2022/0355674 A1   Nov. 10, 2022

(30) Foreign Application Priority Data
Jun. 30, 2019  (CN) .......................... 201910582151.5

(51) Int. Cl.
*B60L 15/20* (2006.01)
*B60L 53/24* (2019.01)

(52) U.S. Cl.
CPC ............... *B60L 15/20* (2013.01); *B60L 53/24* (2019.02); *B60Y 2200/91* (2013.01)

(58) Field of Classification Search
CPC ........ H02J 7/0068; H02J 2207/40; H02J 7/02; H02J 2310/48; B60L 53/00; B60L 53/24; B60L 15/20; B60Y 2200/91
(Continued)

(56) References Cited

U.S. PATENT DOCUMENTS

| | | |
|---|---|---|
| 10,797,631 B2 | 10/2020 | Nawa |
| 2008/0242463 A1* | 10/2008 | Yamada ................ B60W 20/00 |
| | | 903/910 |
| 2012/0019174 A1 | 1/2012 | Mahlein et al. |

FOREIGN PATENT DOCUMENTS

| | | |
|---|---|---|
| CN | 102263430 A | 11/2011 |
| CN | 102371997 A | 3/2012 |

(Continued)

OTHER PUBLICATIONS

International Search Report and Written Opinion for Application No. PCT/CN2020/098149, mailed on Sep. 28, 2020, 8 pages.

*Primary Examiner* — Rexford N Barnie
*Assistant Examiner* — Swarna N Chowdhuri

(57) ABSTRACT

An energy conversion apparatus and a vehicle are provided. The energy conversion apparatus includes a motor coil of a motor (101), a bridge arm converter (102), a bus capacitor (103) connected to the bridge arm converter (102) in parallel, and a controller (104) connected to the bridge arm converter (102). When the energy conversion apparatus is connected to an external power supply, according to to-be-driven power of the motor and to-be-charged power of an external battery (105), the controller (104) controls the bridge arm converter (102) to cause electrical energy of the external power supply to flow to a drive-charging circuit, and adjusts a current of the drive-charging circuit, to cause the external power supply to drive the motor to output drive power and charge the external battery (105) at the same time.

18 Claims, 7 Drawing Sheets

(58) Field of Classification Search
USPC .......................................................... 307/9.1
See application file for complete search history.

(56) References Cited

FOREIGN PATENT DOCUMENTS

| | | | |
|---|---|---|---|
| CN | 103684202 | A | 3/2014 |
| CN | 108123491 | A | 6/2018 |
| CN | 207481695 | U | 6/2018 |
| CN | 109219923 | A | 1/2019 |
| DE | 102016209905 | A1 | 12/2016 |
| DE | 102018000488 | A1 | 7/2018 |
| JP | 2014161142 | A * | 9/2014 |

* cited by examiner

ENERGY CONVERSION APPARATUS AND VEHICLE

CROSS-REFERENCE TO RELATED APPLICATIONS

This application is a National Phase Application of International Patent Application No. PCT/CN2020/098149, filed on Jun. 24, 2020, which is based on and claims priority to and benefits of Chinese Patent Application 201910582151.5, entitled "ENERGY CONVERSION APPARATUS AND VEHICLE" and filed on Jun. 30, 2019. The entire content of all of the above identified applications is incorporated herein by reference.

FIELD

This application relates to the field of vehicle technologies, and in particular, to an energy conversion apparatus and a vehicle.

BACKGROUND

In recent years, with the continuous development of electric vehicle technologies, acceptance of electric vehicles by the market is increasingly increased, and battery charging and motor drive attract wide attention as core technologies of electric vehicles. Currently, a battery charging circuit and a motor drive circuit in an existing electric vehicle on the market are separated, where the external battery charging circuit is configured to charge a battery of the electric vehicle, the motor drive circuit is configured to drive a motor of the electric vehicle, and the two circuits do not interfere with each other and are mutually independent.

However, although battery charging and motor drive processes of the electric vehicle may be completed by using the two circuits separately, the two circuits in the foregoing method do not interfere with each other and are mutually independent. As a result, a circuit structure including the external battery charging circuit and the motor drive circuit is complex, and the structure has low integration, a large volume, and high costs.

Based on the above, the related art has problems of a complex total circuit structure of a motor drive and charging system, low integration, a large volume, and high costs.

SUMMARY

An objective of this application is to provide an energy conversion apparatus and a vehicle, to resolve the problems of a complex total structure of a motor drive and charging system, low integration, a large volume, and high costs in the related art.

This application is implemented as follows: A first aspect of this application provides an energy conversion apparatus, including a motor coil of a motor, a bridge arm converter, a bus capacitor connected to the bridge arm converter in parallel, and a controller connected to the bridge arm converter, where the bridge arm converter is connected to the motor coil;

the motor coil, the bus capacitor, and the bridge arm converter are all connected to an external charging port, and the bus capacitor is connected to an external battery in parallel;

the external charging port, the motor coil, the bridge arm converter, the bus capacitor, and the external battery form a drive-charging circuit; and when the energy conversion apparatus is connected to an external power supply through the external charging port, according to to-be-driven power of the motor and to-be-charged power of the external battery, the controller controls the bridge arm converter to cause electrical energy of the external power supply to flow to the drive-charging circuit, and adjusts a current of the drive-charging circuit, to cause the external power supply to drive the motor to output drive power and charge the external battery simultaneously.

According to an embodiment of this application, the controller obtains a switch-on moment and duration of the bridge arm converter according to the to-be-driven power of the motor and the to-be-charged power of the external battery, and adjusts the current of the drive-charging circuit according to the switch-on moment and duration of the bridge arm converter.

According to an embodiment of this application, the external charging port is a direct current (DC) charging port, the external power supply is a DC power supply device, a working period of the drive-charging circuit includes a first working stage and a second working stage; and the motor coil includes a first coil and a second coil, and the bridge arm converter includes a first bridge arm connected to the first coil and a second bridge arm connected to the second coil;

in the first working stage, the controller controls a switch-on moment and duration of the first bridge arm and a switch-on moment and duration of the second bridge arm according to the to-be-driven power of the motor and the to-be-charged power of the external battery, to cause electrical energy of the DC power supply device to flow back to the DC power supply device after flowing through the first coil and the first bridge arm, and cause electrical energy of the bus capacitor to flow back to the bus capacitor after flowing through the second bridge arm, the second coil, the first coil, and the first bridge arm; and in the second working stage, the controller controls the switch-on moment and duration of the first bridge arm and the switch-on moment and duration of the second bridge arm according to the to-be-charged power of the external battery, to cause the electrical energy of the DC power supply device to flow through the external battery and the bus capacitor and flow back to the DC power supply device after flowing through the first coil and the first bridge arm, and the electrical energy forms a loop current among the second coil, the first coil, the first bridge arm, and the second bridge arm.

According to an embodiment of this application, the drive-charging circuit is further operated at a starting period before the working period of the drive-charging circuit;

the starting period of the drive-charging circuit includes a first starting stage and a second starting stage;

in the first starting stage, the controller controls the switch-on moment and duration of the first bridge arm and the switch-on moment and duration of the second bridge arm according to the to-be-driven power of the motor and the to-be-charged power of the external battery, to cause the electrical energy of the DC power supply device to flow back to the DC power supply device after flowing through the first coil and the first bridge arm; and in the second starting stage, the controller controls the switch-on moments and durations of the first bridge arm and the switch-on moment and duration of the second bridge arm, to cause the electrical energy of the DC power supply device to flow through the bus capacitor and flow back to the DC power supply device after flowing through the first coil and the first bridge arm.

According to an embodiment of this application, the energy conversion apparatus further includes a bidirectional bridge arm, wherein the external charging port further includes an alternating current (AC) charging port, the bidirectional bridge arm and the bridge arm converter are connected in parallel, the bidirectional bridge arm is further connected to the controller and the AC charging port, the AC charging port is connected to an AC power supply device, and the working period of the drive-charging circuit includes a third working stage and a fourth working stage; and the motor coil includes a first coil and a second coil, and the bridge arm converter includes a first bridge arm connected to the first coil and a second bridge arm connected to the second coil;

in the third working stage, the controller controls the switch-on moment and duration of the first bridge arm, the switch-on moment and duration of the second bridge arm, and a switch-on moment and duration of the bidirectional bridge arm according to the to-be-driven power of the motor and the to-be-charged power of the external battery, to cause electrical energy of the AC power supply device to flow back to the AC power supply device after flowing through the first coil, the first bridge arm, and the bidirectional bridge arm, and cause electrical energy of the bus capacitor to flow back to the bus capacitor after flowing through the second bridge arm, the second coil, the first coil, and the first bridge arm; and in the fourth working stage, the controller controls the switch-on moment and duration of the first bridge arm and the switch-on moment and duration of the second bridge arm according to the to-be-charged power of the external battery, to cause the electrical energy of the AC power supply device to flow through the external battery and the bus capacitor and flow back to the AC power supply device after flowing through the first coil, the first bridge arm, and the bidirectional bridge arm, and the electrical energy forms a loop current among the second coil, the first coil, the first bridge arm, and the second bridge arm.

According to an embodiment of this application, the drive-charging circuit is further operated at a starting period before the working period of the drive-charging circuit;

the starting period of the drive-charging circuit includes a third starting stage and a fourth starting stage;

in the third starting stage, the controller controls the switch-on moment and duration of the first bridge arm, the switch-on moment and duration of the second bridge arm, and the switch-on moment and duration of the bidirectional bridge arm according to the to-be-driven power of the motor and the to-be-charged power of the external battery, to cause the electrical energy of the AC power supply device to flow back to the AC power supply device after flowing through the first coil, the first bridge arm, and the bidirectional bridge arm; and in the fourth starting stage, the controller controls the switch-on moment and duration of the first bridge arm, the switch-on moment and duration of the second bridge arm, and the switch-on moment and duration of the bidirectional bridge arm, to cause the electrical energy of the AC power supply device to flow back to the AC power supply device after flowing through the first coil, the first bridge arm, and the bus capacitor and then flowing through the bidirectional bridge arm.

According to an embodiment of this application, the external charging port, the motor coil, the bridge arm converter, the bus capacitor, and the external battery form a drive-charging-heating circuit;

when the external charging port is connected to the external power supply, according to the to-be-driven power of the motor, the to-be-charged power of the external battery, and to-be-heated power of the motor coil, the bridge arm converter is controlled to cause electrical energy of the external power supply to flow to the drive-charging-heating circuit, and a current of the drive-charging-heating circuit is adjusted, to cause the external power supply to drive the motor to output drive power, charge the external battery, and cause the motor coil to produce heat through power consumption at the same time; and the controller obtains a switch-on moment and duration of the bridge arm converter according to the to-be-driven power of the motor, the to-be-charged power of the external battery, and the to-be-heated power of the motor coil, and adjusts the current of the drive-charging-heating circuit according to the switch-on moment and duration of the bridge arm converter.

According to an embodiment of this application, the external charging port is a DC charging port, the external power supply is a DC power supply device, and a working period of the drive-charging-heating circuit includes a first working stage and a second working stage; and the motor coil includes a first coil and a second coil, and the bridge arm converter includes a first bridge arm connected to the first coil and a second bridge arm connected to the second coil;

in the first working stage, the controller controls the switch-on moment and duration of the first bridge arm and the switch-on moment and duration of the second bridge arm according to the to-be-driven power of the motor, the to-be-charged power of the external battery, and the to-be-heated power of the motor coil, to cause the electrical energy of the DC power supply device to flow back to the DC power supply device after flowing through the first coil and the first bridge arm, and cause the electrical energy on the bus capacitor to flow back to the bus capacitor after flowing through the second bridge arm, the second coil, the first coil, and the first bridge arm; and in the second working stage, the controller controls the switch-on moment and duration of the first bridge arm and the switch-on moment and duration of the second bridge arm according to the to-be-charged power of the external battery, to cause the electrical energy of the DC power supply device to flow through the external battery and the bus capacitor and flow back to the DC power supply device after flowing through the first coil and the first bridge arm, and the electrical energy forms a loop current among the second coil, the first coil, the first bridge arm, and the second bridge arm.

According to an embodiment of this application, the energy conversion apparatus further includes a bidirectional bridge arm, wherein the external charging port further includes an AC charging port, the bidirectional bridge arm and the bridge arm converter are connected in parallel, the bidirectional bridge arm is further connected to the controller and the AC charging port, the AC charging port is connected to an AC power supply device, and the working period of the drive-charging-heating circuit includes a third working stage and a fourth working stage; and the motor coil includes a first coil and a second coil, and the bridge arm converter includes a first bridge arm connected to the first coil and a second bridge arm connected to the second coil;

in the third working stage, the controller controls the switch-on moment and duration of the first bridge arm, the switch-on moment and duration of the second bridge arm, and the switch-on moment and duration of the bidirectional bridge arm according to the to-be-driven power of the motor, the to-be-charged power of the external battery, and the to-be-heated power of the motor coil, to cause the electrical energy of the AC power supply device to flow back to the AC power supply device after flowing through the first coil, the first bridge arm, and the bidirectional bridge arm, and cause the electrical energy on the bus capacitor to flow back to the bus capacitor after flowing through the second bridge arm, the second coil, the first coil, and the first bridge arm; and in the fourth working stage, the controller controls the switch-on moment and duration of the first bridge arm and the switch-on moment and duration of the second bridge arm according to the to-be-charged power of the external battery, to cause the electrical energy of the AC power supply device to flow back to the AC power supply device after flowing through the first coil, the first bridge arm, the external battery, the bus capacitor, and the bidirectional bridge arm, and the electrical energy forms a loop current among the second coil, the first coil, the first bridge arm, and the second bridge arm.

A second aspect of this application provides an energy conversion apparatus, including:

a motor;

an in-vehicle charger, including a charging connection end group, the charging connection end group including a first charging connection end and a second charging connection end;

a motor controller, including a bridge arm converter, the bridge arm converter being connected to a motor coil of the motor;

an energy storage, including a bus capacitor and an energy storage connection end group connected in parallel, the bus capacitor and the bridge arm converter being connected in parallel, and the energy storage connection end group including a first energy storage connection end and a second energy storage connection end; and a controller, connected to the bridge arm converter, where the motor coil, the bridge arm converter, and the bus capacitor form a drive-charging circuit; and according to to-be-driven power of the motor and to-be-charged power of an external battery, the controller controls the bridge arm converter to cause external electrical energy to flow to the drive-charging circuit, and adjusts a current of the drive-charging circuit, to cause the external electrical energy to drive the motor to output drive power and discharge outward through the drive-charging circuit at the same time.

According to an embodiment of this application, the first charging connection end and the second charging connection end are connected to an external power supply separately, and the external battery is connected to the first energy storage connection end and the second energy storage connection end; and the external power supply, the motor coil, the bridge arm converter, the bus capacitor, and the external battery form the drive-charging circuit.

According to an embodiment of this application, the controller obtains a switch-on moment and duration of the bridge arm converter, and adjusts the current of the drive-charging circuit according to the switch-on moment and duration of the bridge arm converter, to drive the motor to output drive power and charge the external battery at the same time through the drive-charging circuit.

According to an embodiment of this application, the external power supply is a direct current (DC) power supply device, and a working period of the drive-charging circuit includes a first working stage and a second working stage; and the motor coil includes a first coil and a second coil, and the bridge arm converter includes a first bridge arm connected to the first coil and a second bridge arm connected to the second coil;

in the first working stage, the controller controls a switch-on moment and duration of the first bridge arm and a switch-on moment and duration of the second bridge arm according to the to-be-driven power of the motor and the to-be-charged power of the external battery, to cause electrical energy of the DC power supply device to flow back to the DC power supply device after flowing through the first coil and the first bridge arm, and cause electrical energy on the bus capacitor to flow back to the bus capacitor after flowing through the second bridge arm, the second coil, the first coil, and the first bridge arm; and in the second working stage, the controller controls the switch-on moment and duration of the first bridge arm and the switch-on moment and duration of the second bridge arm, to cause the electrical energy of the DC power supply device to flow through the external battery and the bus capacitor and flow back to the DC power supply device after flowing through the first coil and the first bridge arm, and the electrical energy forms a loop current among the second coil, the first coil, the first bridge arm, and the second bridge arm.

According to an embodiment of this application, the energy conversion apparatus further includes a bidirectional bridge arm, wherein the bidirectional bridge arm and the bridge arm converter are connected in parallel, the charging connection end group further includes a third charging connection end, the bidirectional bridge arm is further connected to the controller and the third charging connection end, the third charging connection end is connected to the external power supply, and the external power supply, the motor coil, the bridge arm converter, the bidirectional bridge arm, the bus capacitor, and the external battery form the drive-charging circuit; and the controller obtains the switch-on moment and duration of the bridge arm converter, and adjusts the current of the drive-charging circuit according to the switch-on moment and duration of the bridge arm converter, to drive the motor to output drive power and charge the external battery at the same time through the drive-charging circuit.

According to an embodiment of this application, the external power supply is an alternating current (AC) power supply device, the AC power supply device is connected to the bidirectional bridge arm, and the working period of the drive-charging circuit includes a third working stage and a fourth working stage; and the motor coil includes a first coil and a second coil, and the bridge arm converter includes a first bridge arm connected to the first coil and a second bridge arm connected to the second coil;

in the third working stage, the controller controls the switch-on moment and duration of the first bridge arm, the switch-on moment and duration of the second bridge arm, and a switch-on moment and duration of the bidirectional bridge arm according to the to-be-driven power of the motor and the to-be-charged power of the external battery, to cause electrical energy of the AC power supply device to flow back to the AC power supply device after flowing through the first coil, the first bridge arm, and the bidirectional bridge arm, and cause electrical energy on the bus capacitor to flow back to the bus capacitor after flowing through the second bridge arm, the second coil, the first coil, and the first bridge arm; and in the fourth working stage, the controller controls the switch-on moment and duration of the first bridge arm, the switch-on moment and duration of the second bridge arm, and the switch-on moment and duration of the bidirectional bridge arm, to cause the electrical energy of the AC power supply device to flow back to the AC power supply device after flowing through the first coil, the first bridge arm, the external battery, and the bus capacitor and then flowing through the bidirectional bridge arm, and the electrical energy forms a loop current among the second coil, the first coil, the first bridge arm, and the second bridge arm.

According to an embodiment of this application, the external power supply, the motor coil, the bridge arm converter, the bus capacitor, and the external battery form a drive-charging-heating circuit; and when the charging connection end group is connected to the external power supply, according to the to-be-driven power of the motor, the to-be-charged power of the external battery, and to-be-heated power of the motor coil, the bridge arm converter is controlled to cause electrical energy of the external power supply to flow to the drive-charging-heating circuit, and a current of the drive-charging-heating circuit is adjusted, to cause the external power supply to drive the motor to output drive power, charge the external battery, and cause the motor coil to produce heat through power consumption at the same time.

According to an embodiment of this application, the controller obtains a switch-on moment and duration of the bridge arm converter according to the to-be-driven power of the motor, the to-be-charged power of the external battery, and the to-be-heated power of the motor coil, and adjusts the current of the drive-charging-heating circuit according to the switch-on moment and duration of the bridge arm converter.

According to an embodiment of this application, the external power supply is a DC power supply device, and a working period of the drive-charging-heating circuit includes a first working stage and a second working stage; and the motor coil includes a first coil and a second coil, and the bridge arm converter includes a first bridge arm connected to the first coil and a second bridge arm connected to the second coil;

in the first working stage, the controller controls the switch-on moment and duration of the first bridge arm and the switch-on moment and duration of the second bridge arm according to the to-be-driven power of the motor, the to-be-charged power of the external battery, and the to-be-heated power of the motor coil, to cause the electrical energy of the DC power supply device to flow back to the DC power supply device after flowing through the first coil and the first bridge arm, and cause the electrical energy on the bus capacitor to flow back to the bus capacitor after flowing through the second bridge arm, the second coil, the first coil, and the first bridge arm; and in the second working stage, the controller controls the switch-on moment and duration of the first bridge arm and the switch-on moment and duration of the second bridge arm, to cause the electrical energy of the DC power supply device to flow through the external battery and the bus capacitor and flow back to the DC power supply device after flowing through the first coil and the first bridge arm, and the electrical energy forms a loop current among the second coil, the first coil, the first bridge arm, and the second bridge arm.

According to an embodiment of this application, the energy conversion apparatus further includes a bidirectional bridge arm, wherein the bidirectional bridge arm and the bridge arm converter are connected in parallel, the bidirectional bridge arm is further connected to the controller, the external power supply is an AC power supply device, the AC power supply device is connected to the bidirectional bridge arm, and the working period of the drive-charging-heating circuit includes a third working stage and a fourth working stage; and the motor coil includes a first coil and a second coil, and the bridge arm converter includes a first bridge arm connected to the first coil and a second bridge arm connected to the second coil;

in the third working stage, the controller controls the switch-on moment and duration of the first bridge arm, the switch-on moment and duration of the second bridge arm, and the switch-on moment and duration of the bidirectional bridge arm according to the to-be-driven power of the motor, the to-be-charged power of the external battery, and the to-be-heated power of the motor coil, to cause the electrical energy of the AC power supply device to flow back to the AC power supply device after flowing through the first coil, the first bridge arm, and the bidirectional bridge arm, and cause the electrical energy on the bus capacitor to flow back to the bus capacitor after flowing through the second bridge arm, the second coil, the first coil, and the first bridge arm; and in the fourth working stage, the controller controls the switch-on moment and duration of the first bridge arm, the switch-on moment and duration of the second bridge arm, and the switch-on moment and duration of the bidirectional bridge arm, to cause the electrical energy of the AC power supply device to flow back to the AC power supply device after flowing through the first coil, the first bridge arm, the external battery, the bus capacitor, and the bidirectional bridge arm, and the electrical energy forms a loop current among the second coil, the first coil, the first bridge arm, and the second bridge arm.

A third aspect of this application provides a vehicle, where the vehicle further includes the energy conversion apparatus according to the first aspect or the second aspect.

This application provides an energy conversion apparatus and a vehicle. The energy conversion apparatus includes a motor coil of a motor, a bridge arm converter, a bus capacitor connected to the bridge arm converter in parallel, and a controller connected to the bridge arm converter. The motor coil, the bridge arm converter, the bus capacitor, an external power supply, and an external battery form a drive-charging circuit. When the energy conversion apparatus is connected to the external power supply, according to the to-be-driven power of the motor and to-be-charged power of the external battery, the controller controls the bridge arm converter to cause electrical energy of the external power supply to flow to the drive-charging circuit, and adjusts a current of the drive-charging circuit, to cause the external power supply to drive the motor to output drive power and charge the external battery at the same time. In this application, by disposing the motor coil, the bridge arm converter, and the bus capacitor in the energy conversion apparatus and forming the drive-charging circuit with the external power supply and the external battery, a current of the external power supply flowing to the drive-charging circuit can be further adjusted by controlling only the bridge arm converter, thereby causing the external power supply to drive the motor to output drive power and charging the external battery at the same time, and performing motor drive and battery charging of a vehicle by using the same system. Components have high reuse degrees, the system has high integration and a simple structure, so that system costs are reduced, a system volume is decreased, and the problems of a complex total structure of an existing motor drive and charging system, low integration, a large volume, and high costs are resolved.

Other aspects and advantages of this application will be given in the following description, some of which will become obvious from the following description or may be learned from practices of this application.

DETAILED DESCRIPTION

Figure 1:
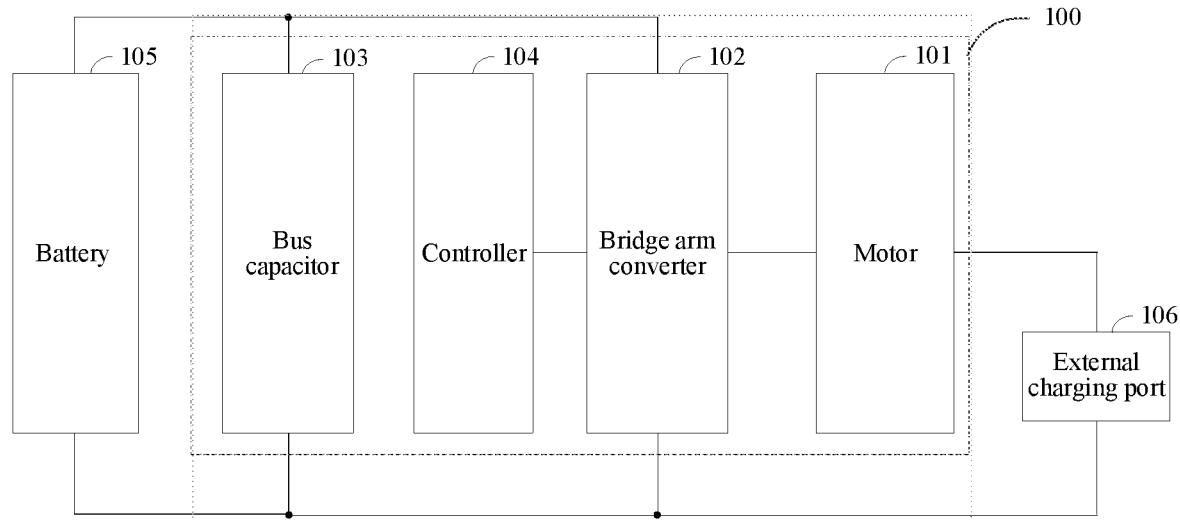
FIG. 1 is a schematic structural diagram of an energy conversion apparatus according to an embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain this application and cannot be construed as a limitation to this application.

As shown in FIG. 1, Embodiment 1 of this application provides an energy conversion apparatus 100, including a motor coil of a motor 101, a bridge arm converter 102, a bus capacitor 103 connected to the bridge arm converter 102 in parallel, and a controller 104 connected to the bridge arm converter 102, where the bridge arm converter 102 is connected to the motor coil;

the motor coil, the bus capacitor 103, and the bridge arm converter 102 are all connected to an external charging port 106, and the bus capacitor 103 is connected to an external battery 105 in parallel;

the external charging port 106, the motor coil, the bridge arm converter 102, the bus capacitor 103, and the external battery 105 form a drive-charging circuit; and when the energy conversion apparatus 100 is connected to an external power supply, according to to-be-driven power of the motor and to-be-charged power of the external battery 105, the controller 104 controls the bridge arm converter 102 to cause electrical energy of the external power supply to flow to the drive-charging circuit, and adjusts a current of the drive-charging circuit, to cause the external power supply to drive the motor to output drive power and charge the external battery 105 at the same time.

The motor 101 may be a synchronous motor (including a brushless synchronous motor) or an asynchronous motor, a quantity of phases of the motor is greater than or equal to 3 (such as a three-phase motor, a five-phase motor, a six-phase motor, a nine-phase motor, or a fifteen-phase motor), and connection points of the motor coil form poles from which neutral lines are led out to be connected to the external power supply. A quantity of motor poles is a common divisor of a quantity of poles, and a specific quantity of poles of the motor depends on a winding parallel structure inside the motor. A quantity of led-out neutral lines and a quantity of poles connected to the neutral lines in parallel inside the motor are determined according to usage of an actual solution. The bridge arm converter 102 includes bridge arms of a plurality of phases connected in parallel, and a quantity of bridge arms in the bridge arm converter 102 is configured according to the quantity of phases of the motor. A bridge arm of each phase includes two power switch units, the power switch unit may be a transistor, an insulated gate bipolar transistor (IGBT), a metal-oxide-semiconductor field-effect transistor (MOSFET), a silicon carbide (SIC) transistor, or another device type, connection points of the two power switches in the bridge arm are connected to one phase coil in the motor, and the power switches in the bridge arm converter 102 may be switched on and switched off according to control signals of the controller 104. The external power supply may be a power supply device providing a direct current (DC). The power supply device may be a DC provided by a DC charging pile, a DC outputted by a single-phase or three-phase alternating current (AC) charging pile through rectification, electrical energy produced by a fuel cell, a DC generated by a generator driven by rotation of a range extender such as an engine through rectification of a generator controller, or another power supply form.

The controller 104 controls, according to the to-be-driven power of the motor 101 and the to-be-charged power of the external battery 105, the bridge arm converter 102 to cause the electrical energy of the external power supply to flow to the drive-charging circuit, which means that the to-be-driven power of the motor is obtained according to target drive power of the motor and current drive power of the motor, the to-be-charged power of the external battery is obtained according to required charging power of the external battery, and switch-on or switch-off and switch-on times of different power switches in the bridge arm converter 102 are adjusted according to the to-be-driven power and the to-be-charged power, to further adjust a magnitude and a direction of a current flowing through the motor coil. A current direction of the motor coil is a direction in which a current flows into each phase coil in the motor or a direction in which a current flows out of each phase coil in the motor, and a current magnitude of the motor coil refers to a magnitude of a current flowing into each phase coil in the motor or a magnitude of a current flowing out of each phase coil in the motor. For example, a current flows in from a motor coil connected to a bridge arm of phase A in the bridge arm converter 102, and flows out of the motor 101 from a motor coil connected to bridge arms of phase B and phase C in the bridge arm converter 102, and since a torque output of the motor 101 may be adjusted by adjusting the current magnitude and direction of each phase coil in the motor 101, and a sum of magnitudes of currents flowing through the motor 101 is equal to an input current of a connection point of each phase coil of the motor 101, the input current may be used for adjusting charging power. A charging process of the external power supply to the external battery 105 and the torque output of the motor 101 may be controlled at the same time by adjusting the current magnitude and direction of each phase coil of the motor 101.

Technical effects of the energy conversion apparatus 100 according to this embodiment of this application lie in that: by disposing the motor coil, the bridge arm converter, and the bus capacitor in the energy conversion apparatus 100 and forming the drive-charging circuit with the external power supply and the external battery, a current of the external power supply flowing to the drive-charging circuit can be further adjusted by controlling only a working state of the bridge arm converter, thereby causing the external power supply to drive the motor to output drive power and charging the external battery at the same time, and performing motor drive and battery charging of a vehicle by using the same system. Components have high reuse degrees, the system has high integration and a simple structure, so that system costs are reduced, a system volume is decreased, and the problems of a complex total structure of an existing motor drive and charging system, low integration, a large volume, and high costs are resolved.

In an embodiment, the motor includes x sets of windings, where $x \geq 1$, and x is an integer. A quantity of phases of an $x^{th}$ set of windings is $m_x$, each phase winding in the $x^{th}$ set of windings includes $n_x$ coil branches, the $n_x$ coil branches of each phase winding are connected together to form a phase endpoint, and one coil branch in the $n_x$ coil branches of each phase winding in the $x^{th}$ set of windings is further connected to one coil branch of $n_x$ coil branches in another phase winding respectively, to form $n_x$ connection points, where $n_x \geq 1$, $m_x \geq 2$, and $m_x$ and $n_x$ are integers.

The x sets of windings form $$\sum_{i=1}^{x} n_i$$

connection points in total, the $$\sum_{i=1}^{x} n_i$$

connection points form T neutral points, and N neutral lines are led out from the T neutral points, where $x \geq 1$, $m_x \geq 2$, a range of T is:

$$\sum_{i=1}^{x} n_i \geq T \geq 1,$$

a range of N is: $T \geq N \geq 1$, and T and N are both integers.

The motor 101 is connected to a motor controller formed by the bridge arm converter 102, the bridge arm converter 102 includes K groups of $M_x$ channels of bridge arms, a first end and a second end of each channel of bridge arms in the K groups of $M_x$ channels of bridge arms are connected together separately, and a midpoint of at least one channel of bridge arms in one group of $M_x$ channels of bridge arms is connected to a phase endpoint in one set of windings of $m_x$ phases in a one-to-one correspondence manner, where $M_x \geq m_x$, $K \geq x$, and K and $M_x$ are both integers.

Figure 2:
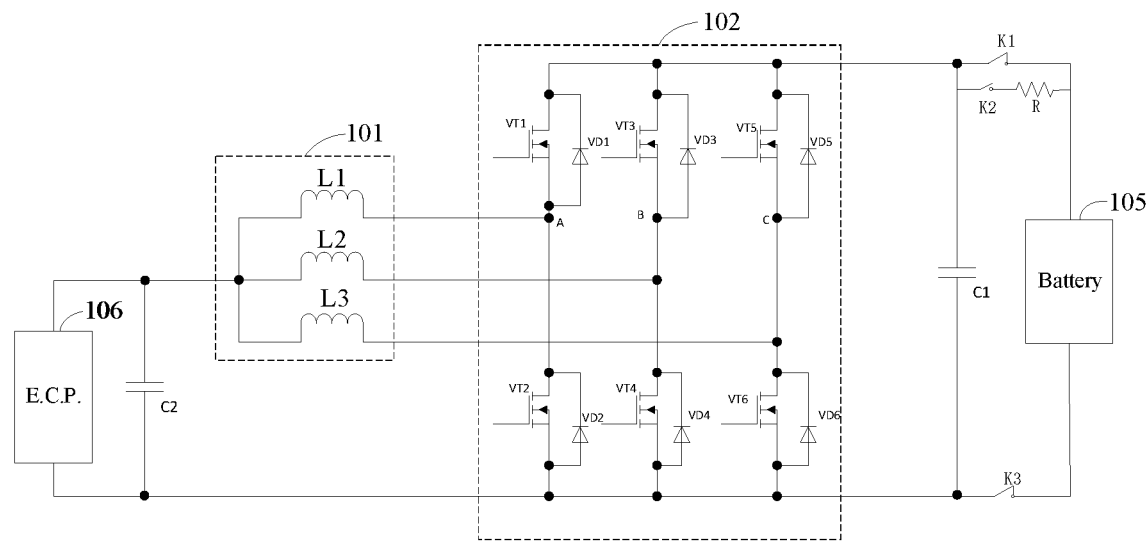
FIG. 2 is a circuit diagram of an energy conversion apparatus according to an embodiment of this application.

As shown in FIG. 2, when K=1, x=1, and $m_1 = M_1 = 3$, the bridge arm converter 102 includes three channels of bridge arms, the motor 101 includes a three-phase winding, each phase winding includes one phase coil branch, and each phase winding is correspondingly connected to a midpoint of one channel of bridge arms. The three-phase winding forms a connection point, the connection point is a neutral point, and a neutral line led out from the neutral point is connected to the external charging port 106. Two ends of each channel of bridge arms in the three channels of bridge arms are connected together separately to form a first convergence end and a second convergence end, a bus capacitor C1 is connected between the first convergence end and the second convergence end in parallel, a first end of the bus capacitor C1 is connected to a first end of a switch K1 and a first end of a switch K2, a second end of the bus capacitor C1 is connected to a first end of a switch K3, a second end of the switch K2 is connected to a first end of a resistor R, a second end of the switch K1 is connected to a second end of the resistor R and a positive electrode end of the external battery 105, and a second end of the switch K3 is connected to a negative electrode end of the external battery 105.

Figure 3:
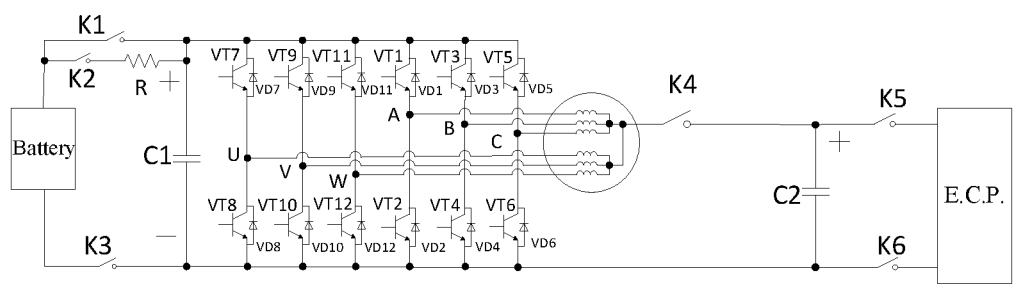
FIG. 3 is another circuit diagram of an energy conversion apparatus according to an embodiment of this application.
Figure 4:
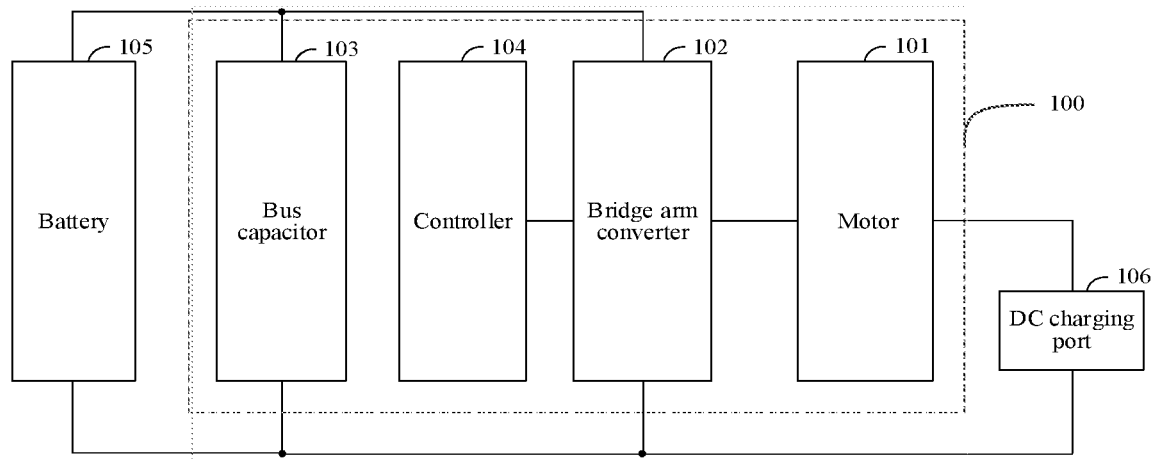
FIG. 4 is another schematic structural diagram of an energy conversion apparatus according to an embodiment of this application.

As shown in FIG. 3, when K=1, x=2, $m_1=3$, and $M_1=6$, the bridge arm converter 102 includes six channels of bridge arms, the motor includes 2 sets of three-phase windings, each phase winding in each set of three-phase windings includes one phase coil branch, and each phase winding is correspondingly connected to a midpoint of one channel of bridge arms. Each set of three-phase windings forms a connection point, 2 connection points of the 2 sets of three-phase windings are connected together to form a neutral point, and a neutral line led out from the neutral point is connected to the external charging port 106. Two ends of each channel of bridge arms in the six channels of bridge arms are connected together separately to form a first convergence end and a second convergence end, a bus capacitor C1 is connected between the first convergence end and the second convergence end in parallel, a first end of the bus capacitor C1 is connected to a first end of a switch K1 and a first end of a switch K2, a second end of the bus capacitor C1 is connected to a first end of a switch K3, a second end of the switch K2 is connected to a first end of a resistor R, a second end of the switch K1 is connected to a second end of the resistor R and a positive electrode end of the external battery 105, and a second end of the switch K3 is connected to a negative electrode end of the external battery 105.

In this embodiment, by setting a quantity of phases of motor windings and a quantity of bridge arms of the bridge arm converter, the motor windings are connected to neutral points that are formed by different quantities of connection points in parallel and from which neutral lines are led out, equivalent phase inductances of the motor are different, and capabilities of the neutral points of the motor for a current to flow are different. Therefore, according to a requirement of charging power and an inductance, a suitable quantity of connection points are selected and connected in parallel to form neutral points from which neutral lines are led out, so as to obtain the required charging power and inductance, thereby improving charging and discharging performance while meeting the charging power.

In an embodiment, the controller 104 obtains a switch-on moment and duration of the bridge arm converter 102 according to the to-be-driven power of the motor 101 and the to-be-charged power of the external battery 105, and adjusts the current of the drive-charging circuit according to the switch-on moment and duration.

In an embodiment, as shown in FIG. 2, using a three-phase motor as an example, a target voltage of a buck-side capacitor C2 and a current voltage of the external battery are obtained, and a maximum output voltage of a charging pile is obtained through communication with the external power supply (charging pile), where the target voltage of the buck-side capacitor C2 is a minimum value of the current voltage of the power battery and the maximum output voltage of the charging pile. A target input current of the three-phase motor is calculated according to the required charging power, a torque output value of the motor, and the target voltage, and the drive power is calculated according to the torque output value of the motor, where the drive power may be calculated according to a formula $$P_1 = \frac{N \times Te}{9550},$$

where N is a rotation speed of the motor, Te is torque of the motor, $P_1$ is the drive power; and the target input current is then calculated according to a formula $$I = \frac{(P_1 + P_2)}{U_2},$$

where $P_2$ is the required charging power, and $U_2$ is the target voltage of the buck-side capacitor C2. A target current of each phase current of the three-phase motor is calculated by using the following Formula 1, Formula 2, and Formula 3 according to a position of a rotor of the motor, the target input current, and the torque output value of the motor:

$T_e=3/2*\rho*[\lambda+(L_d-L_q)*2/3*[\sin \alpha*IA+\sin(\alpha-120)*IB+\sin(\alpha+120)*IC]]*2/3*(\cos \alpha*IA+\cos(\alpha-120)*IB+\cos(\alpha+120)*IC)$     Formula 1:

$IA+IB+IC=I$     Formula 2:

$M=IA\times IA+IB\times IB+IC\times IC$, where     Formula 3:

α is an electrical angle of the rotor, IA, IB, and IC are target currents of phase currents of the three-phase motor, I is the target input current, Te is the torque output value of the motor, λ, ρ, $L_d$, $L_q$ are motor parameters, and M is a minimum value of a plurality of groups of data.

A plurality of groups of data of the target currents IA, IB, and IC of the phase currents of the three-phase motor may be obtained according to Formula 1 and Formula 2, and then one group of data whose M is the smallest among the plurality of groups of data is obtained according to Formula 3 as data of the target currents IA, IB, and IC of the phase currents of the three-phase motor.

An average duty ratio of control pulses of three phase currents is obtained by using the following formula according to the target voltage of the buck-side capacitor, the target input current, and the voltage of the power battery:

$U_2=U_1\times D_0-I\times R$,     Formula 4:

where $U_2$ is the target voltage of the buck-side capacitor, $U_1$ is the voltage of the power battery, $D_0$ is the average duty ratio of the control pulses of the three phase currents, I is the target input current, and R is equivalent impedance of the three-phase motor.

$U_1\times D_0$ is an average voltage on bridge arms of a three-phase inverter, $I\times R$ is a voltage drop on the three-phase motor, and the foregoing formula may be obtained according to a case that the average voltage on the bridge arms of the three-phase inverter is equal to a sum of the voltage drop on the three-phase motor and the target voltage of the buck-side capacitor.

A first target duty ratio of a control pulse of each phase bridge arm is obtained by using the following formula according to the average duty ratio, the target input current, the target current of each phase current, and the voltage of the power battery:

$$D_1 = D_0 - \frac{IR - I_1 \times R_1}{U_1},$$     Formula 5 where $I_1$ is the target current of each phase current, $R_1$ is equivalent impedance of each phase coil, and $D_1$ is the target duty ratio of the control pulse of each phase bridge arm.

When a flow direction of a current in a winding coil is flowing from a connection point of each phase bridge arm and each phase coil to the buck-side capacitor, a voltage of the connection point of each phase bridge arm and each phase coil is greater than a voltage of the buck-side capacitor, and the voltage of the connection point of each phase bridge arm and each phase coil is equal to a sum of a voltage drop on the phase coil and the target voltage of the buck-side capacitor, namely, $U_1\times D_1=R_1\times I_1+U_2$. When the flow direction of the current in the winding coil is flowing from the buck-side capacitor to the connection point of each phase bridge arm and each phase coil, the voltage of the connection point of each phase bridge arm and each phase coil is less than the voltage of the buck-side capacitor, and the voltage of the connection point of each phase bridge arm and each phase coil is equal to a difference between the target voltage of the buck-side capacitor and the voltage drop on the phase coil, namely, $U_1\times D_1=U_2-R_1\times I_1$. Then, Formula 5 may be obtained in combination with Formula 4, namely, the target duty ratio of the control pulse of each phase bridge arm may be obtained.

A vector position of a current is obtained according to the torque output value of the motor, a phase relationship among the three phase currents is further obtained, a switch-on moment of the bridge arm converter is obtained according to a phase of each phase current, and a switch-on duration of the bridge arm converter is obtained according to the target duty ratio of the control pulse of each phase bridge arm.

In this embodiment, relative to implementing charging or drive control separately, by increasing control over the switch-on duration of the bridge arm converter, and adjusting the current of the external power supply flowing to the drive-charging circuit, the external power supply may drive the motor to output drive power and the external battery may be charged at the same time.

In an embodiment, the external charging port is a DC charging port, the external power supply is a DC power supply device, and a working period of the drive-charging circuit includes a first working stage and a second working stage; and the motor coil includes a first coil and a second coil, and the bridge arm converter 102 includes a first bridge arm connected to the first coil and a second bridge arm connected to the second coil.

In the first working stage, the controller 104 controls switch-on moments and durations of the first bridge arm and the second bridge arm according to the to-be-driven power of the motor and the to-be-charged power of the external battery, to cause electrical energy of the DC power supply device to flow back to the DC power supply device after flowing through the first coil and the first bridge arm, and cause electrical energy on the bus capacitor 103 to flow back to the bus capacitor 103 after flowing through the second bridge arm, the second coil, the first coil, and the first bridge arm.

In the second working stage, the controller 104 controls the switch-on moments and durations of the first bridge arm and the second bridge arm, to cause the electrical energy of the DC power supply device to flow through the external battery 105 and the bus capacitor 103 and flow back to the DC power supply device after flowing through the first coil and the first bridge arm, and the electrical energy forms a loop current among the second coil, the first coil, the first bridge arm, and the second bridge arm.

In the first working stage, the first coil is one phase coil or at least two phase coils connected to each other, the first bridge arm is one channel of bridge arms or at least two channels of bridge arms connected in parallel, and the one phase coil in the first coil is connected to the one channel of bridge arms in the first bridge arm. The second coil is one phase coil or at least two phase coils connected to each other, the second bridge arm is one channel of bridge arms or at least two channels of bridge arms connected in parallel, and the one phase coil in the second coil is connected to the one channel of bridge arms in the second bridge arm. A difference between the first coil and the second coil lies in that flow directions of currents of the two coils are opposite. For example, the first bridge arm of the bridge arm converter 102 is controlled to cause a current direction in the first coil to be flowing in a first direction, the first direction may be flowing from the motor to the bridge arm converter 102, the second bridge arm of the bridge arm converter 102 is controlled to cause the current direction in the second coil to be flowing in a second direction, and the second direction may be flowing from the bridge arm converter 102 to the motor. That is, in the first working stage, currents flowing in different directions exist in the motor coil at the same time, so that drive of the motor 101 may be controlled.

It should be noted that, coils in the first coil and the second coil are not fixed, the first coil and the second coil change at any time according to the current directions, and power switches of bridge arms connected to the coils may be selected for control. For example, the motor includes a first phase coil L1, a second phase coil L2, and a third phase coil L3, a lower bridge arm of a bridge arm connected to the first phase coil L1 is controlled to be switched on to cause a current in the first phase coil L1 to flow from the motor coil to the bridge arm converter 102, and upper bridge arms of bridge arms connected to the second phase coil L2 and the third phase coil L3 are controlled to be switched on to cause currents in the second phase coil L2 and the third phase coil L3 to flow from the bridge arm converter 102 to the motor coil. In this case, the first coil is the first phase coil L1, the second coil is the second phase coil L2 and the third phase coil L3. In a next period, by changing the switched-on power switches in the bridge arms, the current directions in the motor coil are changed, the first coil may be the first phase coil L1 and the second phase coil L2, and the second coil may be the third phase coil L3.

In the first working stage, the electrical energy of the DC power supply device is caused to flow back to the DC power supply device after flowing through the first coil and the first bridge arm, for storing the electrical energy of the DC power supply device in the first coil, namely, implementing an energy storage process in a charging process of the DC power supply device to the external battery 105. Since a current flows through the first coil in the energy storage process, the motor 101 may be driven to work in this case. In the first working stage, the electrical energy on the bus capacitor 103 flows back to the bus capacitor 103 after flowing through the second bridge arm, the second coil, the first coil, and the first bridge arm, for causing the bus capacitor 103 to discharge to the first coil and the second coil through the bridge arm converter 102. Since the first coil and the second coil are connected to each other, directions in which a current flows through the first coil and the second coil are different, so that the motor 101 may be continuously driven while the DC power supply device performs energy storage on the first coil.

The first working stage and the second working stage form a period, and the period is a fixed value, so that after the switch-on moments and durations of the first bridge arm and the second bridge arm in the first working stage are determined, the switch-on moments and durations of the first bridge arm and the second bridge arm in the second working stage may be directly determined.

In the second working stage, the electrical energy of the DC power supply device flows through the external battery and the bus capacitor 103 and flows back to the DC power supply device after flowing through the first coil and the first bridge arm, for implementing charging of the DC power supply device and the first coil to the external battery and the bus capacitor 103, namely, implementing a free-wheeling charging process in the charging process of the DC power supply device to the external battery. The electrical energy in the second working stage forms a loop current among the second coil, the first coil, the first bridge arm, and the second bridge arm, for causing a current in the second coil to flow to the first coil. In the first working stage, a current outputted by the bus capacitor 103 flows through the second coil through the second bridge arm, and then flows through the second coil and the first coil, to increase a voltage of a connection point of the second coil and the second bridge arm. Since a magnitude relationship between a voltage of a capacitor on an external charging port side and the voltage of the connection point of the second coil and the second bridge arm decides a flow direction of the current, if the voltage of the connection point of the second coil and the second bridge arm is greater than the voltage of the capacitor on the external charging port side, a current of the winding flows in from the connection point of the second coil and the second bridge arm, so that the current in the second coil may flow to the first coil. The first coil and the second coil are connected to each other, so that the directions in which the current flows through the first coil and the second coil are different, and the motor 101 may be driven while the DC power supply device and the first coil charge the external battery 105 and the bus capacitor 103.

Figure 5:
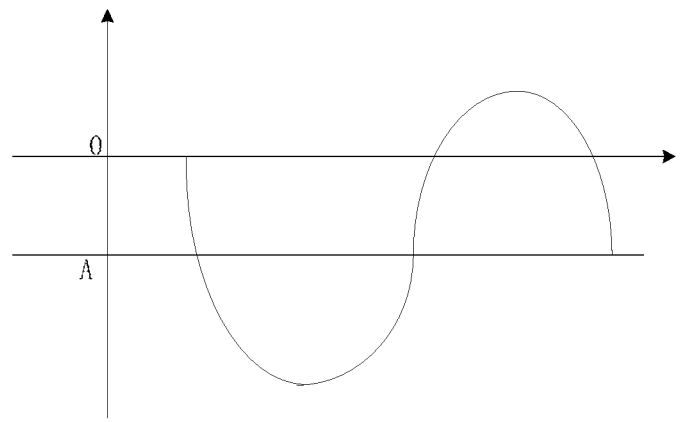
FIG. 5 is a waveform diagram of a current of a drive-charging circuit of an energy conversion apparatus according to an embodiment of this application.

FIG. 5 shows a waveform diagram of a current on a phase of the motor 101 when charging and drive are controlled collaboratively. The bridge arm converter 102 outputs a current to a motor end, a current direction flowing into a motor phase winding is used as a positive direction, and as can be seen from FIG. 5, a negative DC component is superimposed on each phase current of the motor 101 based on a sine wave. The negative DC component is an average current flowing from the external power supply into each phase of the motor in each period, energy outputted by the external power supply is greater than energy consumed for drive, and the remaining energy is energy for charging the external battery 105.

In this embodiment, the working period of the drive-charging circuit is divided into the first working stage and the second working stage, where each working stage includes a charging process to the external battery and a drive process to the motor. The currents of the drive-charging circuit in the first working stage and the second working stage are adjusted respectively by controlling the switch-on moments and durations of the first bridge arm and the second bridge arm, so that a part of the energy outputted by the DC power supply device in the entire working period is used for charging the external battery, and a part thereof is used for driving the motor, thereby implementing collaborative work of charging the external battery and driving the motor.

In an embodiment, in the second working stage, the controller 104 controls the switch-on moments and durations of the first bridge arm and the second bridge arm according to the to-be-charged power of the external battery, to cause the electrical energy of the DC power supply device to flow through the external battery and the bus capacitor 103 and flow back to the DC power supply device after flowing through the first coil and the first bridge arm, and the electrical energy forms a loop current among the second coil, the first coil, the first bridge arm, and the second bridge arm.

In the second working stage, the switch-on moments and durations of the first bridge arm and the second bridge arm may be redetermined according to the to-be-charged power. A difference between this embodiment and the foregoing implementation lies in that the working period of the drive-charging circuit is not a fixed period, and variable period control over the drive-charging circuit is implemented by redetermining the switch-on moments and durations of the first bridge arm and the second bridge arm, so that control over the charging process and drive process of the drive-charging circuit is more flexible, thereby helping improve working efficiency of the drive-charging circuit.

In an embodiment, a starting period of the drive-charging circuit is further included before the working period of the drive-charging circuit;

the starting period of the drive-charging circuit includes a first starting stage and a second starting stage;

in the first starting stage, the controller 104 controls the switch-on moments and durations of the first bridge arm and the second bridge arm according to the to-be-driven power of the motor 101 and the to-be-charged power of the external battery, to cause the electrical energy of the DC power supply device to flow back to the DC power supply device after flowing through the first coil and the first bridge arm; and in the second starting stage, the controller 104 controls the switch-on moments and durations of the first bridge arm and the second bridge arm, to cause the electrical energy of the DC power supply device to flow through the external battery 105 and the bus capacitor 103 and flow back to the DC power supply device after flowing through the first coil and the first bridge arm.

A starting period is further included before the working period of the drive-charging circuit, the starting period only works when the circuit is powered on and started, the starting period does not work after the working period is started, and the working period works circularly subsequently. The starting period charges the bus capacitor 103, the first starting stage in the starting period is used for causing the DC power supply device to perform energy storage on the first coil, and the second starting stage causes the DC power supply device and the first coil to charge the bus capacitor 103, to ensure that a high voltage is formed on buses on two sides of the bus capacitor 103. When the working period starts, the bus capacitor 103 discharges to the motor coil through the bridge arm converter 102, and the bus capacitor 103 is charged by the DC power supply device and the first coil again, to enable the working period to work circularly. In addition, the first coil in the starting period may be alternatively all coils rather than a part of coils in the motor coil. For example, when the motor 101 is a three-phase motor, three-phase bridge arm power switches may be selected for control at the same time. That is, in the first starting stage, three-phase upper bridge arms may be switched off at the same time, and three-phase lower bridge arms may be switched on at the same time; and in the second starting stage, the three-phase upper bridge arms may be switched on at the same time, and the three-phase lower bridge arms may be switched off at the same time.

Figure 6:
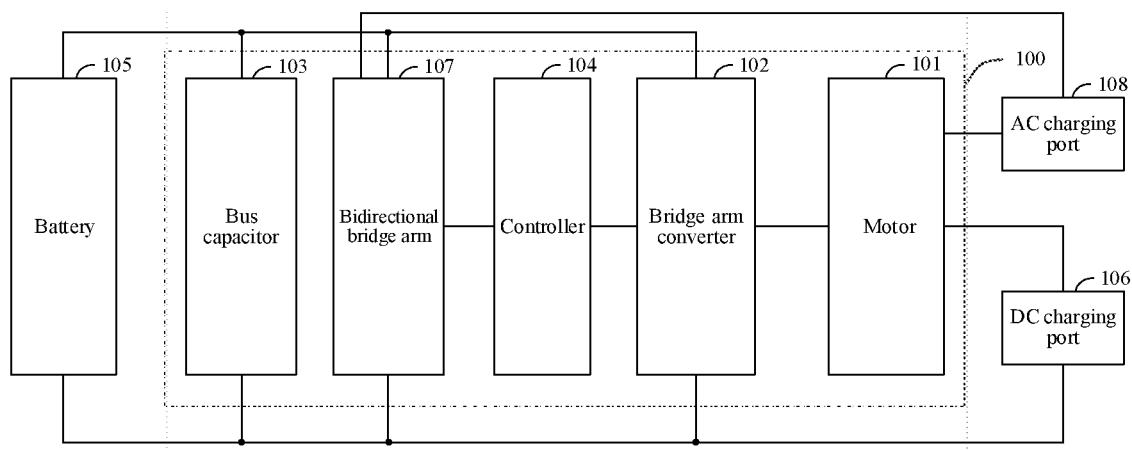
FIG. 6 is another schematic structural diagram of an energy conversion apparatus according to an embodiment of this application.

In an embodiment, as shown in FIG. 6, the energy conversion apparatus 100 further includes a bidirectional bridge arm 107, the external charging port 106 further includes an AC charging port 108, the bidirectional bridge arm 107 and the bridge arm converter 102 are connected in parallel, the bidirectional bridge arm 107 is further connected to the controller 104 and the AC charging port 108, the AC charging port 108 is connected to an AC power supply device, and the working period of the drive-charging circuit includes a third working stage and a fourth working stage;

in the third working stage, the controller 104 controls switch-on moments and durations of the first bridge arm, the second bridge arm, and the bidirectional bridge arm 107 according to the to-be-driven power of the motor 101 and the to-be-charged power of the external battery 105, to cause electrical energy of the AC power supply device to flow back to the AC power supply device after flowing through the first coil, the first bridge arm, and the bidirectional bridge arm 107, and cause electrical energy on the bus capacitor 103 to flow back to the bus capacitor 103 after flowing through the second bridge arm, the second coil, the first coil, and the first bridge arm; and in the fourth working stage, the controller 104 controls the switch-on moments and durations of the first bridge arm, the second bridge arm, and the bidirectional bridge arm 107, to cause the electrical energy of the AC power supply device to flow back to the AC power supply device after flowing through the first coil, the first bridge arm, the external battery, and the bus capacitor 103 and flowing through the bidirectional bridge arm 107, and the electrical energy forms a loop current among the second coil, the first coil, the first bridge arm, and the second bridge arm.

The bidirectional bridge arm 107 includes power switch modules connected in series and configured to transmit a received current to the AC charging port or receive a current outputted by the AC charging port. In the third working stage, the electrical energy of the AC power supply device is caused to flow back to the AC power supply device after flowing through the first coil, the first bridge arm, the external battery 105, the bus capacitor 103, and the bidirectional bridge arm 107, for storing the electrical energy of the AC power supply device in the first coil, namely, implementing an energy storage process in a charging process of the AC power supply device to the external battery. Since a current flows through the coil in the energy storage process, the motor 101 is in a driven state in this case. In the third working stage, the electrical energy on the bus capacitor 103 flows back to the bus capacitor 103 after flowing through the second bridge arm, the second coil, the first coil, and the first bridge arm, for causing the bus capacitor 103 to discharge to the first coil and the second coil through the bridge arm converter 102. Since the first coil and the second coil are connected to each other, directions in which a current flows through the first coil and the second coil are different, so that the motor 101 may be driven while the AC power supply device performs energy storage on the first coil.

The third working stage and the fourth working stage form a period, and the period is a fixed value, so that after the switch-on moments and durations of the first bridge arm and the second bridge arm in the third working stage are determined, the switch-on moments and durations of the first bridge arm and the second bridge arm in the fourth working stage may be directly determined.

In the fourth working stage, the electrical energy of the AC power supply device flows through the external battery 105 and the bus capacitor 103 and flows back to the AC power supply device after flowing through the first coil, the first bridge arm, and the bidirectional bridge arm 107, for implementing charging of the AC power supply device and the first coil to the external battery and the bus capacitor 103, namely, implementing a free-wheeling charging process in the charging process of the AC power supply device to the external battery 105. In the free-wheeling charging process, since a current flows through the motor coil, the motor 101 is also driven. The electrical energy in the fourth working stage forms a loop current among the second coil, the first coil, the first bridge arm, and the second bridge arm, for causing a current in the second coil to flow to the first coil. In the third working stage, a current outputted by the bus capacitor 103 flows through the second coil and the first coil through the second bridge arm, to cause a voltage of a connection point of the second coil and the second bridge arm to be greater than a voltage of a connection point of the first coil and the first bridge arm, so that the current in the second coil may flow to the first coil. The first coil and the second coil are connected to each other, so that the directions in which the current flows through the first coil and the second coil are different, and the motor may be driven while the AC power supply device and the first coil charge the external battery and the bus capacitor 103.

In an embodiment, in the fourth working stage, the controller 104 controls the switch-on moments and durations of the first bridge arm and the second bridge arm according to the to-be-charged power of the external battery 105, to cause the electrical energy of the AC power supply device to flow through the external battery 105 and the bus capacitor 103 and flow back to the AC power supply device after flowing through the first coil, the first bridge arm, and the bidirectional bridge arm 107, and the electrical energy forms a loop current among the second coil, the first coil, the first bridge arm, and the second bridge arm.

In the fourth working stage, the switch-on moments and durations of the first bridge arm and the second bridge arm may be redetermined according to the to-be-charged power. A difference between this embodiment and the foregoing implementation lies in that the working period of the drive-charging circuit is not a fixed period, and variable period control over the drive-charging circuit is implemented by redetermining the switch-on moments and durations of the first bridge arm and the second bridge arm, so that control over the charging process and drive process of the drive-charging circuit is more flexible, thereby helping improve working efficiency of the drive-charging circuit.

In an embodiment, a starting period of the drive-charging circuit is further included before the working period of the drive-charging circuit;

the starting period of the drive-charging circuit includes a third starting stage and a fourth starting stage;

in the third starting stage, the controller 104 controls the switch-on moments and durations of the first bridge arm, the second bridge arm, and the bidirectional bridge arm 107 according to the to-be-driven power of the motor 101 and the to-be-charged power of the external battery 105, to cause the electrical energy of the AC power supply device to flow back to the AC power supply device after flowing through the first coil, the first bridge arm, and the bidirectional bridge arm 107; and in the fourth starting stage, the controller 104 controls the switch-on moments and durations of the first bridge arm, the second bridge arm, and the bidirectional bridge arm 107, to cause the electrical energy of the AC power supply device to flow through the bidirectional bridge arm 107 and then flow back to the AC power supply device after flowing through the first coil, the first bridge arm, and the bus capacitor 103.

A starting period is further included before the working period of the drive-charging circuit, and is used for charging the bus capacitor 103. The third starting stage is used for causing the AC power supply device to perform energy storage on the first coil, and the fourth starting stage causes the AC power supply device and the first coil to charge the bus capacitor 103, to ensure that a high voltage is formed on buses on two sides of the bus capacitor 103. When the working period starts, the bus capacitor 103 discharges to the motor coil through the bridge arm converter 102, and the bus capacitor 103 is charged by the AC power supply device and the first coil again, to enable the working period to work circularly.

The technical solution of the embodiments of this application is described in detail below through a specific circuit structure.

Figure 7:
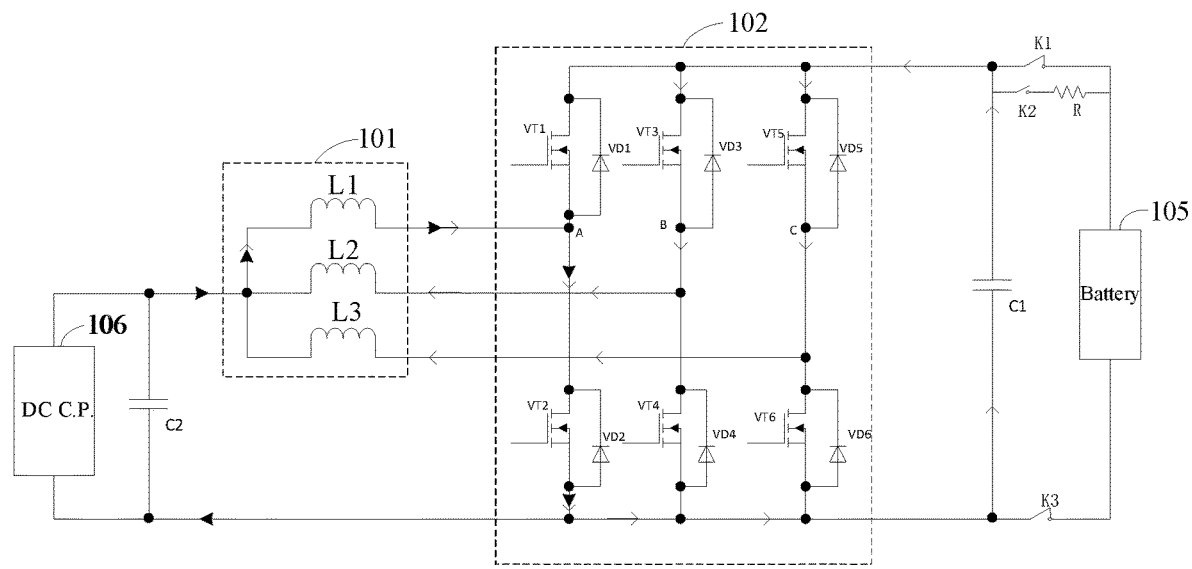
FIG. 7 is a current flow direction diagram of DC supply of an energy conversion apparatus according to an embodiment of this application.

As shown in FIG. 7, the bridge arm converter 102 includes a first power switch unit, a second power switch unit, a third power switch unit, a fourth power switch unit, a fifth power switch, and a sixth power switch, and a control end of each power switch unit is connected to the controller 104. The first power switch unit and the second power switch unit in the bridge arm converter 102 form a first bridge arm, the third power switch unit and the fourth power switch unit form a second bridge arm, and the fifth power switch unit and the sixth power switch unit form a third bridge arm. The first power switch unit includes a first upper bridge arm VT1 and a first top diode VD1, the second power switch unit includes a second lower bridge arm VT2 and a second bottom diode VD2, the third power switch unit includes a third upper bridge arm VT3 and a third top diode VD3, the fourth power switch unit includes a fourth lower bridge arm VT4 and a fourth bottom diode VD4, the fifth power switch unit includes a fifth upper bridge arm VT5 and a fifth top diode VD5, and the sixth power switch unit includes a sixth lower bridge arm VT6 and a sixth bottom diode VD6. The first power switch unit, the third power switch unit, and the fifth power switch unit are connected together to form a first convergence end, the second power switch unit, the fourth power switch, and the sixth power switch are connected together to form a second convergence end, a bus capacitor C1 is connected between the first convergence end and the second convergence end, a first end of the bus capacitor C1 is connected to a first end of a switch K1 and a first end of a switch K2, a second end of the bus capacitor C1 is connected to a first end of a switch K3, a second end of the switch K2 is connected to a first end of a resistor R, a second end of the switch K1 is connected to a second end of the resistor R and a positive electrode end of the external battery 105, and a second end of the switch K3 is connected to a negative electrode end of the external battery 105. The motor includes a first phase coil L1, a second phase coil L2, and a third phase coil L3, where one end of each phase coil is connected together to form a neutral point to be connected to a DC power supply device, and the other end of each phase coil is connected to a midpoint of a phase bridge arm respectively. When the first coil is the first phase coil L1, and the second coil includes the second phase coil L2 and the third phase coil L3, the DC power supply device, the first phase coil L1, and the second power switch form a DC energy storage loop, and the DC energy storage loop is used for both energy storage and drive. In an embodiment, a current flows from a positive electrode of the DC power supply device and back to a negative electrode of the DC power supply device through the first phase coil L1 and the second lower bridge arm VT2. The DC power supply device, the first phase coil L1, the first power switch, the bus capacitor C1, and an external battery form a battery charging loop, the external battery charging loop is used for both energy storage and drive, and a current flows from the positive electrode of the DC power supply device and back to the negative electrode of the DC power supply device through the first phase coil L1, the first upper bridge arm VT1, the external battery 105, and the bus capacitor C1. The bus capacitor C1, the fifth power switch, the third power switch, the third phase coil L3, the second phase coil L2, the first phase coil L1, and the second power switch form a first drive circuit of the motor, where a current flows from one end of the bus capacitor C1 and back to the other end of the bus capacitor C1 through the fifth upper bridge arm VT5, the third phase coil L3, the first phase coil L1, and the second lower bridge arm VT2, and a current flows from the one end of the bus capacitor C1 and back to the other end of the bus capacitor C1 through the third upper bridge arm VT3, the second phase coil L2, the first phase coil L1, and the second lower bridge arm VT2 at the same time. The second phase coil L2, the third phase coil L3, the first phase coil L1, the first power switch, the third power switch, and the fifth power switch form a second drive circuit of the motor, where flow directions of currents form a loop current among the second phase coil L2, the first phase coil L1, the first top diode VD1, and the third upper bridge arm VT3 and a loop current among the third phase coil L3, the first phase coil L1, the first top diode VD1, and the fifth upper bridge arm VT5 respectively. When the first coil is the first phase coil L1 and the second phase coil L2, and the second coil is the third phase coil L3, the DC power supply device, the first phase coil L1, the second phase coil L2, the second power switch, and the fourth power switch form a DC energy storage loop, and the DC energy storage loop is used for both energy storage and drive. In an embodiment, a current flows from the positive electrode of the DC power supply device and back to the negative electrode of the DC power supply device through the first phase coil L1 and the second lower bridge arm VT2, and flows from the positive electrode of the DC power supply device and back to the negative electrode of the DC power supply device through the second phase coil L2 and the fourth lower bridge arm VT4 at the same time. The DC power supply device, the first phase coil L1, the second phase coil L2, the first power switch, the third power switch, the bus capacitor C1, and an external battery form a battery charging loop, the external battery charging loop is used for both energy storage and drive, and a current flows from the positive electrode of the DC power supply device and back to the negative electrode of the DC power supply device through the first phase coil L1, the first upper bridge arm VT1, the external battery 105, and the bus capacitor C1, and flows from the positive electrode of the DC power supply device and back to the negative electrode of the DC power supply device through the second phase coil L2, the second upper bridge arm VT2, the external battery 105, and the bus capacitor C1. The bus capacitor C1, the fifth power switch, the third phase coil L3, the first phase coil L1, the second phase coil L2, the second power switch, and the fourth power switch form a first drive circuit of the motor, where a current flows from one end of the bus capacitor C1 and back to the other end of the bus capacitor C1 through the fifth upper bridge arm VT5, the third phase coil L3, the first phase coil L1, and the second lower bridge arm VT2, and a current flows from the one end of the bus capacitor C1 and back to the other end of the bus capacitor C1 through the fifth upper bridge arm VT5, the third phase coil L3, the second phase coil L2, and the fourth lower bridge arm VT4 at the same time. The third phase coil L3, the first phase coil L1, the second phase coil L2, the first power switch, the third power switch, and the fifth power switch form a second drive circuit of the motor, where flow directions of currents form a loop current among the third phase coil L3, the first phase coil L1, the first top diode VD1, and the fifth upper bridge arm VT5 and a loop current among the third phase coil L3, the second phase coil L2, the third top diode VD3, and the third upper bridge arm VT3 respectively.

For DC supply, when the first coil is the first phase coil L1, and the second coil is the second phase coil L2 and the third phase coil L3, as shown in FIG. 7, in the first working stage, the controller 104 controls the switch-on moments and durations of the first bridge arm and the second bridge arm according to the to-be-driven power of the motor and the to-be-charged power of the external battery, to cause a current outputted by the DC power supply device in the DC energy storage loop to flow through the first phase coil L1 and the second power switch sequentially and back to the DC power supply device, and cause a current outputted by the bus capacitor C1 in the first drive circuit of the motor to flow through the fifth power switch, the third power switch, the third phase coil L3, the second phase coil L2, the first phase coil L1, and the second power switch sequentially and back to the bus capacitor C1 at the same time, thereby causing the DC energy storage loop and the first drive circuit of the motor to work at the same time.

Figure 8:
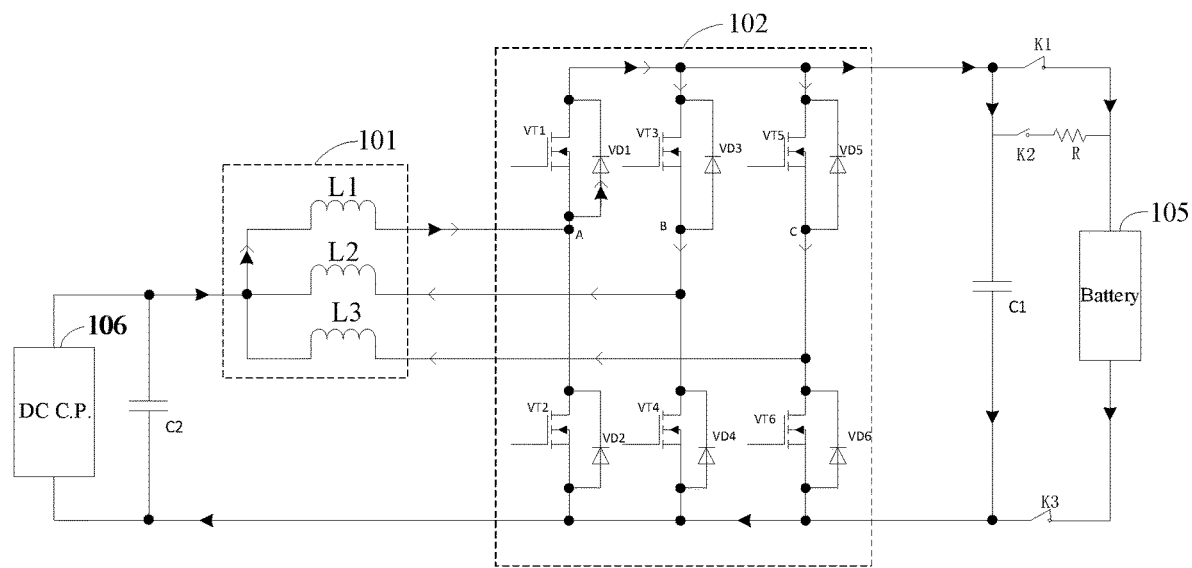
FIG. 8 is another current flow direction diagram of DC supply of an energy conversion apparatus according to an embodiment of this application.

As shown in FIG. 8, in the second working stage, the controller 104 controls the switch-on moments and durations of the first bridge arm and the second bridge arm, to cause a current outputted by the DC power supply device in the external battery charging loop to flow through the first phase coil L1, the first power switch, the bus capacitor C1, and the external battery and back to the DC power supply device, and cause currents outputted by the second phase coil L2 and the third phase coil L3 of the second drive circuit of the motor to flow through the first phase coil L1, the first power switch, the third power switch, and the fifth power switch and back to the second phase coil L2 and the third phase coil L3, thereby causing the external battery charging circuit and the second drive circuit of the motor to work at the same time.

Figure 9:
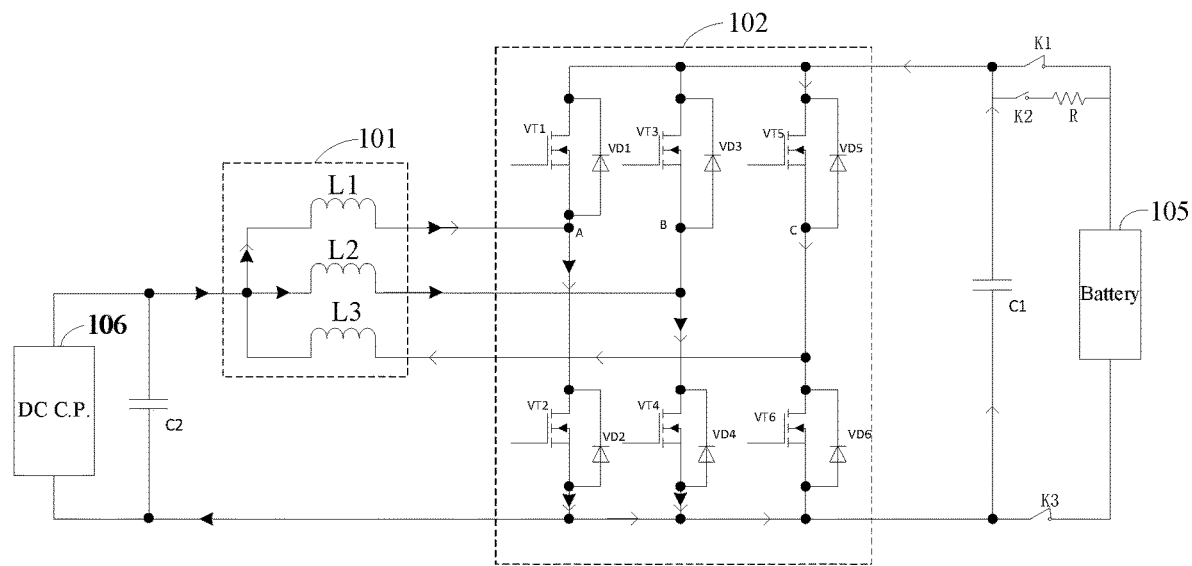
FIG. 9 is another current flow direction diagram of DC supply of an energy conversion apparatus according to an embodiment of this application.

For DC supply, when the first coil is the first phase coil L1 and the second phase coil L2, and the second coil is the third phase coil L3, as shown in FIG. 9, in the first working stage, the controller 104 controls the switch-on moments and durations of the first bridge arm and the second bridge arm according to to-be-driven power of the motor and to-be-charged power of the external battery, to cause a current outputted by the DC power supply device in the DC energy storage loop to flow through the first phase coil L1, the second phase coil L2, the second power switch, and the fourth power switch sequentially and back to the DC power supply device, and cause a current outputted by the bus capacitor C1 in the first drive circuit of the motor to flow through the fifth power switch, the third phase coil L3, the second phase coil L2, the first phase coil L1, the second power switch, and the fourth power switch sequentially and back to the bus capacitor C1 at the same time, thereby causing the DC energy storage loop and the first drive circuit of the motor to work at the same time.

Figure 10:
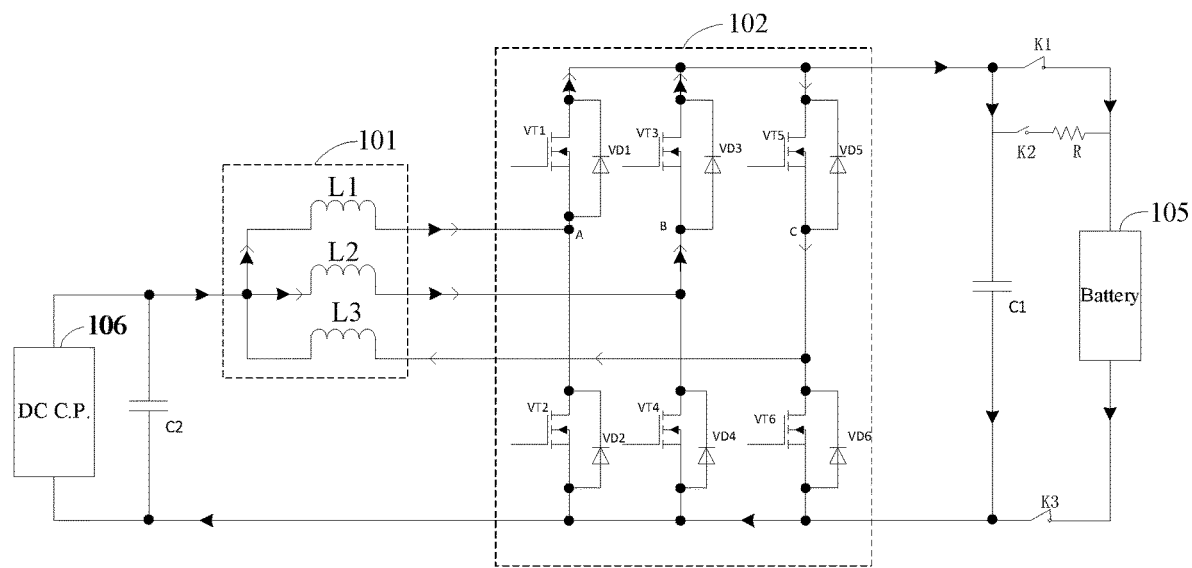
FIG. 10 is another current flow direction diagram of DC supply of an energy conversion apparatus according to an embodiment of this application.

As shown in FIG. 10, in the second working stage, the controller 104 controls the switch-on moments and durations of the first bridge arm and the second bridge arm, to cause a current outputted by the DC power supply device in the external battery charging loop to flow through the first phase coil L1, the second phase coil L2, the first power switch, the third power switch, the bus capacitor C1, and the external battery and back to the DC power supply device, and cause a current outputted by the third phase coil L3 of the second drive circuit of the motor to flow through the first phase coil L1, the second phase coil L2, the first power switch, the third power switch, and the fifth power switch and back to the third phase coil L3, thereby causing the external battery charging circuit and the second drive circuit of the motor to work at the same time.

Figure 11:
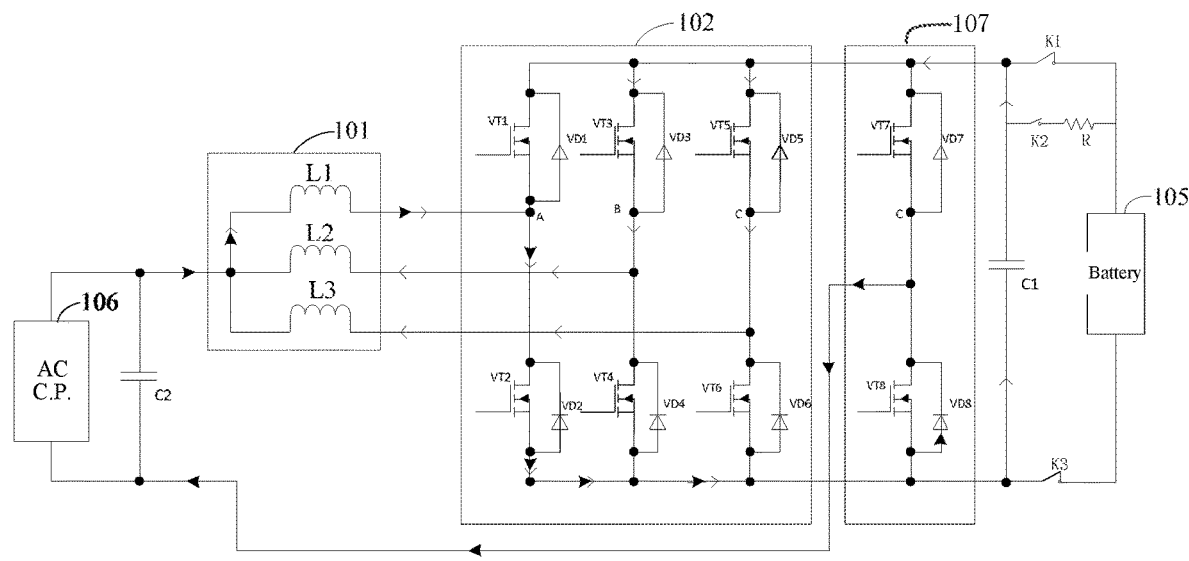
FIG. 11 is a current flow direction diagram of AC supply of an energy conversion apparatus according to an embodiment of this application.

For AC supply, as shown in FIG. 11, a difference with FIG. 7 lies in that: the drive-charging circuit further includes a bidirectional bridge arm 107, the bidirectional bridge arm 107 includes a seventh power switch and an eighth power switch, where a first end of the seventh power switch is connected to the first convergence end of the bridge arm converter 102, a second end of the seventh power switch and a first end of the eighth power switch are connected together to one end of an AC power supply device, and a second end of the eight power switch is connected to the second convergence end of the bridge arm converter 102. When the first coil is the first phase coil L1, and the second coil includes the second phase coil L2 and the third phase coil L3, the AC power supply device, the first phase coil L1, the second power switch, and the eighth power switch form an AC energy storage loop, and the AC power supply device, the first phase coil L1, the first power switch, and the seventh power switch may also form an AC energy storage loop. In an embodiment, a current flows from a positive electrode of the AC power supply device and back to a negative electrode of the AC power supply device through the first phase coil L1, the second lower bridge arm VT2, and an eighth lower bridge arm VT8. The AC power supply device, the first phase coil L1, the first power switch, the bus capacitor C1, an external battery, and the eighth power switch form a battery charging loop, the external battery charging loop is used for both energy storage and drive, and a current flows from the positive electrode of the AC power supply device and back to the negative electrode of the AC power supply device through the first phase coil L1, the first upper bridge arm VT1, the external battery 105, the bus capacitor C1, and an eighth bottom diode VD8. The bus capacitor C1, the fifth power switch, the third power switch, the third phase coil L3, the second phase coil L2, the first phase coil L1, and the second power switch form a third drive circuit of the motor, where a current flows from one end of the bus capacitor C1 and back to the other end of the bus capacitor C1 through the fifth upper bridge arm VT5, the third phase coil L3, the first phase coil L1, and the second lower bridge arm VT2, and a current flows from the one end of the bus capacitor C1 and back to the other end of the bus capacitor C1 through the third upper bridge arm VT3, the second phase coil L2, the first phase coil L1, and the second lower bridge arm VT2 at the same time. The second phase coil L2, the third phase coil L3, the first phase coil L1, the first power switch, the third power switch, and the fifth power switch form a fourth drive circuit of the motor, where flow directions of currents form a loop current among the second phase coil L2, the first phase coil L1, the first top diode VD1, and the third upper bridge arm VT3 and a loop current among the third phase coil L3, the first phase coil L1, the first top diode VD1, and the fifth upper bridge arm VT5 respectively. When the first coil is the first phase coil L1 and the second phase coil L2, and the second coil is the third phase coil L3, the AC power supply device, the first phase coil L1, the second phase coil L2, the second power switch, the fourth power switch, and the eighth power switch form an AC energy storage loop, and the AC energy storage loop is used for both energy storage and drive. In an embodiment, a current flows from the positive electrode of the AC power supply device and back to the negative electrode of the AC power supply device through the first phase coil L1, the second lower bridge arm VT2, and the eighth lower bridge arm VT8, and flows from the positive electrode of the AC power supply device and back to the negative electrode of the AC power supply device through the second phase coil L2, the fourth lower bridge arm VT4, and the eighth lower bridge arm VT8 at the same time. The AC power supply device, the first phase coil L1, the second phase coil L2, the first power switch, the third power switch, the bus capacitor 103, an external battery, and the eighth power switch form a battery charging loop, the external battery charging loop is used for both energy storage and drive, and a current flows from the positive electrode of the AC power supply device and back to the negative electrode of the AC power supply device through the first phase coil L1, the first upper bridge arm VT1, the external battery 105, the bus capacitor C1, and the eighth bottom diode VD8, and flows from the positive electrode of the AC power supply device and back to the negative electrode of the AC power supply device through the second phase coil L2, the second upper bridge arm VT2, the external battery 105, the bus capacitor C1, and the eighth bottom diode VD8. The bus capacitor C1, the fifth power switch, the third power switch, the third phase coil L3, the second phase coil L2, the first phase coil L1, the second power switch, and the fourth power switch form a third drive circuit of the motor, where a current flows from one end of the bus capacitor C1 and back to the other end of the bus capacitor C1 through the fifth upper bridge arm VT5, the third phase coil L3, the first phase coil L1, and the second lower bridge arm VT2, and a current flows from the one end of the bus capacitor C1 and back to the other end of the bus capacitor C1 through the fifth upper bridge arm VT5, the third phase coil L3, the second phase coil L2, and the fourth lower bridge arm VT4 at the same time. The third phase coil L3, the first phase coil L1, the second phase coil L2, the first power switch, the third power switch, and the fifth power switch form a fourth drive circuit of the motor, where flow directions of currents form a loop current among the third phase coil L3, the first phase coil L1, the first top diode VD1, and the fifth upper bridge arm VT5 and a loop current among the third phase coil L3, the second phase coil L2, the third top diode VD3, and the third upper bridge arm VT3 respectively.

When the first coil is the first phase coil L1, and the second coil includes the second phase coil L2 and the third phase coil L3, as shown in FIG. 11, in the third working stage, the controller 104 controls the switch-on moments and durations of the first bridge arm and the second bridge arm according to the to-be-driven power of the motor and the to-be-charged power of the external battery, to cause a current outputted by the AC power supply device in the AC energy storage loop to flow through the first phase coil L1, the second power switch, and the eighth power switch sequentially and back to the AC power supply device, and cause a current outputted by the bus capacitor 103 in the third drive circuit of the motor to flow through the fifth power switch, the third power switch, the third phase coil L3, the second phase coil L2, the first phase coil L1, and the second power switch sequentially and back to the bus capacitor 103 at the same time, thereby causing the AC energy storage loop and the third drive circuit of the motor to work at the same time.

Figure 12:
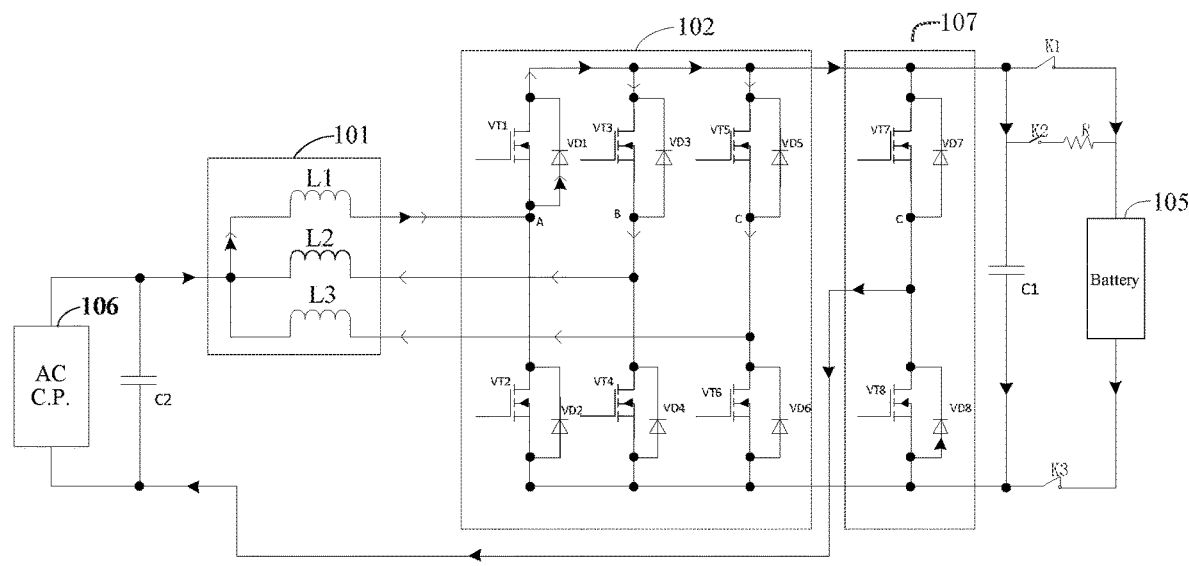
FIG. 12 is another current flow direction diagram of AC supply of an energy conversion apparatus according to an embodiment of this application.

As shown in FIG. 12, in the fourth working stage, the controller 104 controls the switch-on moments and durations of the first bridge arm and the second bridge arm, to cause a current outputted by the AC power supply device in the external battery charging loop to flow through the first phase coil L1, the first power switch, the bus capacitor 103, the external battery, and the eighth power switch and back to the AC power supply device, and cause currents outputted by the second phase coil L2 and the third phase coil L3 of the fourth drive circuit of the motor to flow through the first phase coil L1, the first power switch, the third power switch, and the fifth power switch and back to the second phase coil L2 and the third phase coil L3, thereby causing the external battery charging circuit and the fourth drive circuit of the motor to work at the same time.

Figure 13:
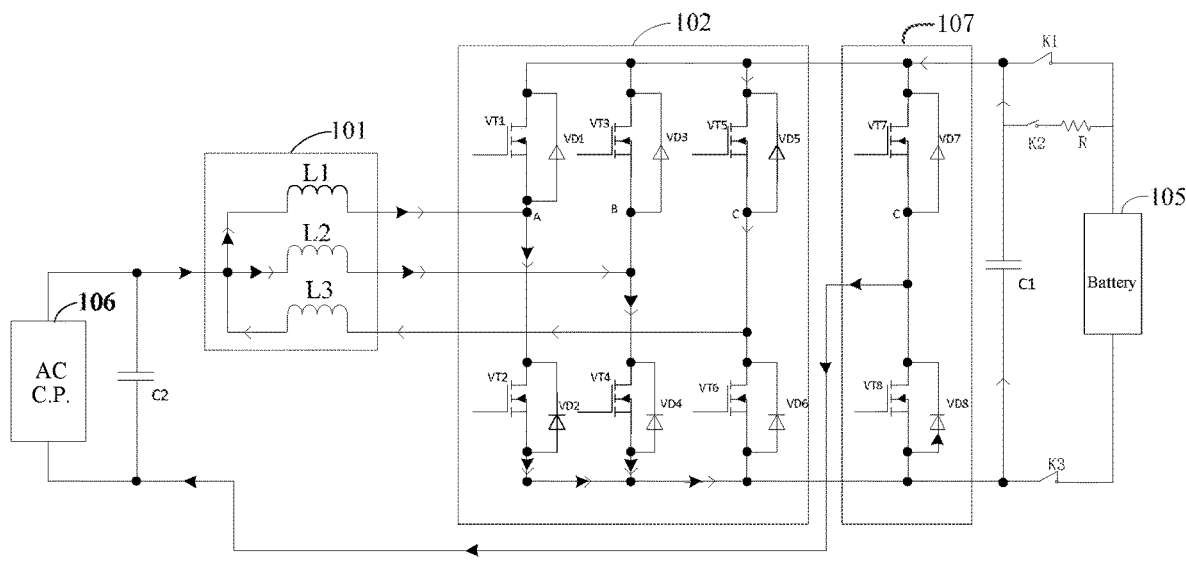
FIG. 13 is another current flow direction diagram of AC supply of an energy conversion apparatus according to an embodiment of this application.

When the first coil is the first phase coil L1 and the second phase coil L2, and the second coil is the third phase coil L3, as shown in FIG. 13, in the third working stage, the controller 104 controls the switch-on moments and durations of the first bridge arm and the second bridge arm according to the to-be-driven power of the motor and the to-be-charged power of the external battery, to cause a current outputted by the AC power supply device in the AC energy storage loop to flow through the first phase coil L1, the second phase coil L2, the second power switch, the fourth power switch, and the eighth power switch sequentially and back to the AC power supply device, and cause a current outputted by the bus capacitor 103 in the third drive circuit of the motor to flow through the fifth power switch, the third phase coil L3, the first phase coil L1, the second phase coil L2, the second power switch, and the fourth power switch sequentially and back to the bus capacitor 103 at the same time, thereby causing the AC energy storage loop and the third drive circuit of the motor to work at the same time.

Figure 14:
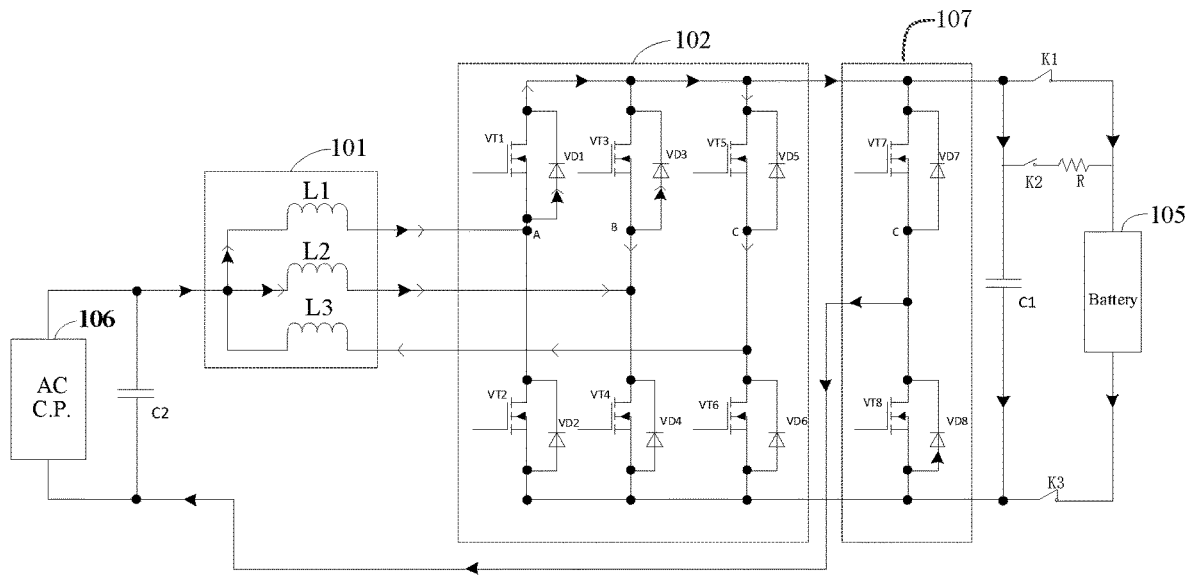
FIG. 14 is another current flow direction diagram of AC supply of an energy conversion apparatus according to an embodiment of this application.

As shown in FIG. 14, in the fourth working stage, the controller 104 controls the switch-on moments and durations of the first bridge arm and the second bridge arm, to cause a current outputted by the AC power supply device in the external battery charging loop to flow through the first phase coil L1, the second phase coil L2, the first power switch, the third power switch, the bus capacitor 103, the external battery, and the eighth power switch and back to the AC power supply device, and cause a current outputted by the third phase coil L3 of the fourth drive circuit of the motor to flow through the first phase coil L1, the second phase coil L2, the first power switch, the third power switch, and the fifth power switch and back to the third phase coil L3, thereby causing the external battery charging circuit and the fourth drive circuit of the motor to work at the same time.

Embodiment 2 of this application provides an energy conversion apparatus 100, where an external charging port 106, a motor coil, a bridge arm converter 102, a bus capacitor 103, and an external battery form a drive-charging-heating circuit; and when the external charging port is connected to an external power supply, according to to-be-driven power of a motor, to-be-charged power of the external battery, and to-be-heated power of the motor coil, the bridge arm converter 102 is controlled to cause electrical energy of the external power supply to flow to the drive-charging-heating circuit, and a current of the drive-charging-heating circuit is adjusted, to cause the external power supply to drive the motor to output drive power, charge the external battery, and cause the motor coil to produce heat through power consumption at the same time.

The motor may be a synchronous motor (including a brushless synchronous motor) or an asynchronous motor, a quantity of phases of the motor is greater than or equal to 3 (such as a three-phase motor, a five-phase motor, a six-phase motor, a nine-phase motor, or a fifteen-phase motor), and connection points of the motor coil form poles from which neutral lines are led out to be connected to the external power supply. A quantity of motor poles is a common divisor of a quantity of poles, and a specific quantity of poles of the motor depends on a winding parallel structure inside the motor. A quantity of led-out neutral lines and a quantity of poles connected to the neutral lines in parallel inside the motor are determined according to usage of an actual solution. The bridge arm converter 102 includes bridge arms of a plurality of phases connected in parallel, and a quantity of bridge arms in the bridge arm converter 102 is configured according to the quantity of phases of the motor. A bridge arm of each phase includes two power switches, the power switch unit may be a transistor, an IGBT, a MOSFET, a SIC transistor, or another device type, connection points of the two power switches in the bridge arm are connected to one phase coil in the motor, and the power switches in the bridge arm converter 102 may be switched on and switched off according to control signals of the controller 104. The external power supply may be a power supply device providing a DC. The power supply device may be a DC provided by a DC charging pile, a DC outputted by a single-phase or three-phase AC charging pile through rectification, electrical energy produced by a fuel cell, a DC generated by a generator driven by rotation of a range extender such as an engine through rectification of a generator controller 104, or another power supply form.

Heat is produced through power consumption of the motor coil, so as to heat a to-be-heated device, for example, heat the external battery in a case that an external ambient temperature is relatively low. By performing heating through the motor coil, a heat exchange medium flowing through the motor coil may be heated, and a cooling loop of the motor is in communication with a cooling loop of the external battery, so as to heat the external battery.

The controller 104 obtains the to-be-driven power of the motor according to target drive power of the motor and current drive power of the motor, obtains the to-be-heated power of the motor coil according to target heating power of the motor coil and current heating power of the motor coil, and controls the bridge arm converter 102 to cause the electrical energy of the external power supply to flow to the drive-charging-heating circuit according to the to-be-driven power of the motor, the to-be-charged power of the external battery, and the to-be-heated power of the motor coil, which means to adjust a magnitude and a direction of a current flowing through the motor coil by adjusting switch-on or switch-off and switch-on times of different power switches in the bridge arm converter 102. A current direction of the motor coil is a direction in which a current flows into each phase coil in the motor or a direction in which a current flows out of each phase coil in the motor, and a current magnitude of the motor coil refers to a magnitude of a current flowing into each phase coil in the motor or a magnitude of a current flowing out of each phase coil in the motor. For example, a current flows in from a motor coil connected to a bridge arm of phase A in the bridge arm converter 102, and flows out of the motor from a motor coil connected to bridge arms of phase B and phase C in the bridge arm converter 102, and since a torque output and heating power of the motor may be adjusted by adjusting the current magnitude and direction of each phase coil in the motor, and a sum of magnitudes of currents flowing through the motor is equal to an input current of a connection point of each phase coil of the motor. The input current may be used for adjusting charging power, and may control a charging process of a DC power supply device to the power battery, the torque output of the motor, and a heating process of the motor coil at the same time by adjusting the current magnitude and direction of each phase coil of the motor.

Technical effects of the energy conversion apparatus 100 according to this embodiment of this application lie in that: by disposing the motor coil, the bridge arm converter 102, and the bus capacitor 103 in the energy conversion apparatus 100 and forming the drive-charging-heating circuit with the external power supply and the external battery, a current of the external power supply flowing to the drive-charging-heating circuit can be further adjusted by controlling only the bridge arm converter 102, thereby causing the external power supply to drive the motor to output power, charging the external battery, and causing the motor coil to produce heat through power consumption at the same time, and performing motor drive, battery charging, and motor coil heating of a vehicle at the same time by using the same system. Components have high reuse degrees, and the system has high integration and a simple structure, so that system costs are reduced, a system volume is decreased, and the problems of a complex total structure of an existing motor drive and charging system, low integration, a large volume, and high costs are resolved.

In an embodiment, the bridge arm converter 102 obtains a switch-on moment and duration and adjusts the current of the drive-charging-heating circuit according to the switch-on moment and duration.

In an embodiment, as shown in FIG. 2, using a three-phase motor as an example, a target input current of the three-phase motor is calculated according to the to-be-heated power, the to-be-charged power, a torque output value of the motor, and the target voltage, and the drive power is calculated according to the torque output value of the motor, where the drive power may be calculated according to a formula $$P_1 = \frac{N \times Te}{9550},$$

where N is a rotation speed of the motor, Te is torque of the motor, $P_1$ is the drive power, and the target input current is then calculated according to a formula $$I = \frac{(P_1 + P + P_2)}{U_2},$$

where P is required heating power, $P_2$ is the required charging power, and $U_2$ is the target voltage of the buck-side capacitor. A target current of each phase current of the three-phase motor is calculated by using the following Formula 1, Formula 2, and Formula 3 according to a position of a rotor of the motor, the target input current, and the torque output value of the motor:

$T_e=3/2*\rho*[\lambda+(L_d-L_q)*2/3*[\sin\alpha*IA+\sin(\alpha-120)*IB+\sin(\alpha+120)*IC]]*2/3*(\cos\alpha*IA+\cos(\alpha-120)*IB+\cos(\alpha+120)*IC)$  Formula 1:

$IA+IB+IC=I$  Formula 2:

$P=(IA\times IA+IB\times IB+IC\times IC)\times R$, where  Formula 3:

α is an electrical angle of the rotor, IA, IB, and IC are target currents of the phase currents of the three-phase motor, I is the target input current, Te is the torque output value of the motor, λ, ρ, $L_d$, $L_q$ are motor parameters, and P is the heating power.

Data of the target currents IA, IB, and IC of the phase currents of the three-phase motor may be obtained according to Formula 1, Formula 2, and Formula 3.

An average duty ratio of control pulses of three phase currents is obtained by using the following formula according to the target voltage of the buck-side capacitor, the target input current, and the voltage of the power battery:

$U_2=U_1\times D_0-I\times R$,  Formula 4:

where $U_2$ is the target voltage of the buck-side capacitor, $U_1$ is the voltage of the power battery, $D_0$ is the average duty ratio of the control pulses of the three phase currents, I is the target input current, and R is equivalent impedance of the three-phase motor.

$U_1\times D_0$ is an average voltage on bridge arms of a three-phase inverter, $I\times R$ is a voltage drop on the three-phase motor, and the foregoing formula may be obtained according to a case that the average voltage on the bridge arms of the three-phase inverter is equal to a sum of the voltage drop on the three-phase motor and the target voltage of the buck-side capacitor.

A first target duty ratio of a control pulse of each phase bridge arm is obtained by using the following formula according to the average duty ratio, the target input current, the target current of each phase current, and the voltage of the power battery:

$$D_1 = D_0 - \frac{IR - I_1 \times R_1}{U_1},\qquad \text{Formula 5}$$

where $I_1$ is the target current of each phase current, $R_1$ is equivalent impedance of each phase coil, and $D_1$ is the target duty ratio of the control pulse of each phase bridge arm.

When a flow direction of a current in a winding coil is flowing from a connection point of each phase bridge arm and each phase coil to the buck-side capacitor, a voltage of the connection point of each phase bridge arm and each phase coil is greater than a voltage of the buck-side capacitor, and the voltage of the connection point of each phase bridge arm and each phase coil is equal to a sum of a voltage drop on the phase coil and the target voltage of the buck-side capacitor, namely, $U_1 \times D_1 = R_1 \times I_1 + U_2$. When the flow direction of the current in the winding coil is flowing from the buck-side capacitor to the connection point of each phase bridge arm and each phase coil, the voltage of the connection point of each phase bridge arm and each phase coil is less than the voltage of the buck-side capacitor, and the voltage of the connection point of each phase bridge arm and each phase coil is equal to a difference between the target voltage of the buck-side capacitor and the voltage drop on the phase coil, namely, $U_1 \times D_1 = U_2 - R_1 \times I_1$. Then, Formula 5 may be obtained in combination with Formula 4, namely, the target duty ratio of the control pulse of each phase bridge arm may be obtained.

In an embodiment, the external power supply is a DC power supply device, and a working period of the drive-charging-heating circuit includes a first working stage and a second working stage; and the motor coil includes a first coil and a second coil, and the bridge arm converter 102 includes a first bridge arm connected to the first coil and a second bridge arm connected to the second coil;

in the first working stage, the controller 104 controls switch-on moments and durations of the first bridge arm and the second bridge arm according to the to-be-driven power of the motor, the to-be-charged power of the external battery, and the to-be-heated power of the motor coil, to cause electrical energy of the DC power supply device to flow back to the DC power supply device after flowing through the first coil and the first bridge arm, and cause electrical energy on the bus capacitor 103 to flow back to the bus capacitor 103 after flowing through the second bridge arm, the second coil, the first coil, and the first bridge arm; and in the second working stage, the controller 104 controls the switch-on moments and durations of the first bridge arm and the second bridge arm, to cause the electrical energy of the DC power supply device to flow through the external battery and the bus capacitor 103 and flow back to the DC power supply device after flowing through the first coil and the first bridge arm, and the electrical energy forms a loop current among the second coil, the first coil, the first bridge arm, and the second bridge arm.

In the first working stage, the first coil is one phase coil or at least two phase coils connected to each other, the first bridge arm is one channel of bridge arms or at least two channels of bridge arms connected in parallel, and the one phase coil in the first coil is connected to the one channel of bridge arms in the first bridge arm. The second coil is one phase coil or at least two phase coils connected to each other, the second bridge arm is one channel of bridge arms or at least two channels of bridge arms connected in parallel, and the one phase coil in the second coil is connected to the one channel of bridge arms in the second bridge arm. A difference between the first coil and the second coil lies in that flow directions of currents of the two coils are opposite. For example, the first bridge arm of the bridge arm converter 102 is controlled to cause a current direction in the first coil to be flowing in a first direction, the first direction may be flowing from the motor to the bridge arm converter 102, the second bridge arm of the bridge arm converter 102 is controlled to cause the current direction in the second coil to be flowing in a second direction, and the second direction may be flowing from the bridge arm converter 102 to the motor. That is, in the first working stage, currents flowing in different directions exist in the motor coil at the same time, so that control over motor drive, battery charging, and motor coil heating may be implemented.

It should be noted that, coils in the first coil and the second coil are not fixed, the first coil and the second coil change at any time according to the current directions, and power switches of bridge arms connected to the coils may be selected for control. For example, the motor includes a first phase coil L1, a second phase coil L2, and a third phase coil L3, a lower bridge arm of a bridge arm connected to the first phase coil L1 is controlled to be switched on to cause a current in the first phase coil L1 to flow from the motor coil to the bridge arm converter 102, and upper bridge arms of bridge arms connected to the second phase coil L2 and the third phase coil L3 are controlled to be switched on to cause currents in the second phase coil L2 and the third phase coil L3 to flow from the bridge arm converter 102 to the motor coil. In this case, the first coil is the first phase coil L1, the second coil is the second phase coil L2 and the third phase coil L3. In a next period, by changing the switched-on power switches in the bridge arms, the current directions in the motor coil are changed, the first coil may be the first phase coil L1 and the second phase coil L2, and the second coil may be the third phase coil L3.

In the first working stage, the electrical energy of the DC power supply device is caused to flow back to the DC power supply device after flowing through the first coil and the first bridge arm, for storing the electrical energy of the DC power supply device in the first coil, namely, implementing an energy storage process in a charging process of the DC power supply device to the external battery, a motor drive process, and a motor coil heating process. Since a current flows through the first coil, the motor may be driven to work and produce heat in this case. In the first working stage, the electrical energy on the bus capacitor 103 flows back to the bus capacitor 103 after flowing through the second bridge arm, the second coil, the first coil, and the first bridge arm, for causing the bus capacitor 103 to discharge to the first coil and the second coil through the bridge arm converter 102. Since the first coil and the second coil are connected to each other, directions in which a current flows through the first coil and the second coil are different, so that the motor may be continuously driven and heated while the DC power supply device performs energy storage on the first coil.

The first working stage and the second working stage form a period, and the period is a fixed value, so that after the switch-on moments and durations of the first bridge arm and the second bridge arm in the first working stage are determined, the switch-on moments and durations of the first bridge arm and the second bridge arm in the second working stage may be directly determined.

In the second working stage, the electrical energy of the DC power supply device flows through the external battery and the bus capacitor 103 and flows back to the DC power supply device after flowing through the first coil and the first bridge arm, for implementing charging of the DC power supply device and the first coil to the external battery and the bus capacitor 103, namely, implementing a free-wheeling charging process in the charging process of the DC power supply device to the external battery. In addition, since a current flows through the first coil, the motor may be driven and the motor coil may be heated. The electrical energy in the second working stage forms a loop current among the second coil, the first coil, the first bridge arm, and the second bridge arm, for causing a current in the second coil to flow to the first coil. In the first working stage, a current outputted by the bus capacitor 103 flows through the second coil through the second bridge arm, and then flows through the second coil and the first coil, to increase a voltage of a connection point of the second coil and the second bridge arm. Since a magnitude relationship between a voltage of a capacitor on an external charging port side and the voltage of the connection point of the coil and the second bridge arm decides a flow direction of the current, if the voltage of the connection point of the second coil and the second bridge arm is greater than the voltage of the capacitor on the external charging port side, a current of the winding flows in from the connection point of the second coil and the second bridge arm, so that the current in the second coil may flow to the first coil. The first coil and the second coil are connected to each other, so that the directions in which the current flows through the first coil and the second coil are different, and the motor may be driven and heated while the DC power supply device and the first coil charge the external battery and the bus capacitor 103.

In this embodiment, the working period of the drive-charging-heating circuit is divided into the first working stage and the second working stage, where each working stage includes a charging process to the external battery, a drive process to the motor, and a heating process to the motor coil. The currents of the drive-charging-heating circuit in the first working stage and the second working stage are adjusted respectively by controlling the switch-on moments and durations of the first bridge arm and the second bridge arm, so that a part of the energy outputted by the DC power supply device in the entire working period is used for charging the external battery, a part thereof is used for driving the motor, and a part thereof is used for heating the motor coil, thereby implementing collaborative work of charging the external battery, driving the motor, and heating the motor coil.

In an embodiment, in the second working stage, the controller 104 controls the switch-on moments and durations of the first bridge arm and the second bridge arm according to the to-be-charged power of the external battery, to cause the electrical energy of the DC power supply device to flow through the external battery and the bus capacitor 103 and flow back to the DC power supply device after flowing through the first coil and the first bridge arm, and the electrical energy forms a loop current among the second coil, the first coil, the first bridge arm, and the second bridge arm.

In the second working stage, the switch-on moments and durations of the first bridge arm and the second bridge arm may be redetermined according to the to-be-charged power. A difference between this embodiment and the foregoing implementation lies in that the working period of the drive-charging-heating circuit is not a fixed period, and variable period control over the drive-charging-heating circuit is implemented by redetermining the switch-on moments and durations of the first bridge arm and the second bridge arm, so that control over the charging process, drive process, and heating process of the drive-charging-heating circuit is more flexible, thereby helping improve working efficiency of the drive-charging-heating circuit.

In an embodiment, a starting period of the drive-charging-heating circuit is further included before the working period of the drive-charging-heating circuit;

the starting period of the drive-charging-heating circuit includes a first starting stage and a second starting stage;

in the first starting stage, the controller 104 controls the switch-on moments and durations of the first bridge arm and the second bridge arm according to the to-be-driven power of the motor, the to-be-charged power of the external battery, and the to-be-heated power of the motor coil, to cause the electrical energy of the DC power supply device to flow back to the DC power supply device after flowing through the first coil and the first bridge arm; and in the second starting stage, the controller 104 controls the switch-on moments and durations of the first bridge arm and the second bridge arm, to cause the electrical energy of the DC power supply device to flow through the bus capacitor 103 and flow back to the DC power supply device after flowing through the first coil and the first bridge arm.

A starting period is further included before the working period of the drive-charging-heating circuit, the starting period only works when the circuit is powered on and started, the starting period does not work after the working period is started, and the working period works circularly subsequently. The starting period charges the bus capacitor 103, and the bus capacitor 103 discharges later to complete the working period. The first starting stage in the starting period is used for causing the DC power supply device to perform energy storage on the first coil, and the second starting stage causes the DC power supply device and the first coil to charge the bus capacitor 103, to ensure that a high voltage is formed on buses on two sides of the bus capacitor 103. When the working period starts, the bus capacitor 103 discharges to the motor coil through the bridge arm converter 102, and the bus capacitor 103 is charged by the DC power supply device and the first coil again, to enable the working period to work circularly. In addition, the first coil in the starting period may be alternatively all coils rather than a part of coils in the motor coil. For example, three-phase bridge arm power switches may be selected for control at the same time. That is, in the first starting stage, three-phase upper bridge arms may be switched off at the same time, and three-phase lower bridge arms may be switched on at the same time; and in the second starting stage, the three-phase upper bridge arms may be switched on at the same time, and the three-phase lower bridge arms may be switched off at the same time.

In an embodiment, the energy conversion apparatus further includes a bidirectional bridge arm, the bidirectional bridge arm is connected to the bridge arm converter 102 in parallel, and the bidirectional bridge arm is further connected to the controller 104. The external power supply is an alternating current (AC) power supply device, the AC power supply device is connected to the bidirectional bridge arm, the working period of the drive-charging-heating circuit includes a third working stage and a fourth working stage, the motor coil includes a first coil and a second coil, and the bridge arm converter 102 includes a first bridge arm connected to the first coil and a second bridge arm connected to the second coil;

in the third working stage, the controller 104 controls switch-on moments and durations of the first bridge arm, the second bridge arm, and the bidirectional bridge arm according to the to-be-driven power of the motor, the to-be-charged power of the external battery, and the to-be-heated power of the motor coil, to cause electrical energy of the AC power supply device to flow back to the AC power supply device after flowing through the first coil, the first bridge arm, and the bidirectional bridge arm, and cause electrical energy on the bus capacitor 103 to flow back to the bus capacitor 103 after flowing through the second bridge arm, the second coil, the first coil, and the first bridge arm; and in the fourth working stage, the controller 104 controls the switch-on moments and durations of the first bridge arm, the second bridge arm, and the bidirectional bridge arm, to cause the electrical energy of the AC power supply device to flow back to the AC power supply device after flowing through the first coil, the first bridge arm, the external battery, and the bus capacitor 103 and flowing through the bidirectional bridge arm, and the electrical energy forms a loop current among the second coil, the first coil, the first bridge arm, and the second bridge arm.

In the third working stage, the electrical energy of the AC power supply device is caused to flow back to the AC power supply device after flowing through the first coil, the first bridge arm, and the bidirectional bridge arm, for storing the electrical energy of the AC power supply device in the first coil, namely, implementing an energy storage process in a charging process of the AC power supply device to the external battery, and the energy storage process also drives the motor and heats the motor coil at the same time. In the third working stage, the electrical energy on the bus capacitor 103 flows back to the bus capacitor 103 after flowing through the second bridge arm, the second coil, the first coil, and the first bridge arm, for causing the bus capacitor 103 to discharge to the first coil and the second coil through the bridge arm converter 102. Since the first coil and the second coil are connected to each other, directions in which a current flows through the first coil and the second coil are different, so that the motor may be driven and the motor coil may be heated while the AC power supply device performs energy storage on the first coil.

The third working stage and the fourth working stage form a period, and the period is a fixed value, so that after the switch-on moments and durations of the first bridge arm and the second bridge arm in the third working stage are determined, the switch-on moments and durations of the first bridge arm and the second bridge arm in the fourth working stage may be directly determined.

In the fourth working stage, the electrical energy of the AC power supply device flows through the external battery and the bus capacitor 103 and flows back to the AC power supply device after flowing through the first coil, the first bridge arm, and the bidirectional bridge arm, for implementing charging of the AC power supply device and the first coil to the external battery and the bus capacitor 103, namely, implementing a free-wheeling charging process in the charging process of the AC power supply device to the external battery. In addition, in the free-wheeling charging process, since a current flows through the motor coil, the motor is driven and the motor coil is heated. The electrical energy in the fourth working stage forms a loop current among the second coil, the first coil, the first bridge arm, and the second bridge arm, for causing a current in the second coil to flow to the first coil. In the third working stage, a current outputted by the bus capacitor 103 flows through the second coil and the first coil through the second bridge arm, to cause a voltage of a connection point of the second coil and the second bridge arm to be greater than a voltage of a connection point of the first coil and the first bridge arm, so that the current in the second coil may flow to the first coil. The first coil and the second coil are connected to each other, so that the directions in which the current flows through the first coil and the second coil are different, and the motor may be driven and the motor coil may be heated while the AC power supply device and the first coil charge the external battery and the bus capacitor 103.

In an embodiment, in the fourth working stage, the controller 104 controls the switch-on moments and durations of the first bridge arm and the second bridge arm according to the to-be-charged power of the external battery, to cause the electrical energy of the AC power supply device to flow back to the AC power supply device after flowing through the first coil, the first bridge arm, the external battery, and the bus capacitor 103 and flowing through the bidirectional bridge arm, and the electrical energy forms a loop current among the second coil, the first coil, the first bridge arm, and the second bridge arm.

In the fourth working stage, the switch-on moments and durations of the first bridge arm and the second bridge arm may be redetermined according to the to-be-charged power. A difference between this embodiment and the foregoing implementation lies in that the working period of the drive-charging-heating circuit is not a fixed period, and variable period control over the drive-charging-heating circuit is implemented by redetermining the switch-on moments and durations of the first bridge arm and the second bridge arm, so that control over the charging process, drive process, and heating process to the motor coil of the drive-charging-heating circuit is more flexible, thereby helping improve working efficiency of the drive-charging-heating circuit.

In an embodiment, a starting period of the drive-charging-heating circuit is further included before the working period of the drive-charging-heating circuit;

the starting period of the drive-charging-heating circuit includes a third starting stage and a fourth starting stage;

in the third starting stage, the controller 104 controls the switch-on moments and durations of the first bridge arm, the second bridge arm, and the bidirectional bridge arm according to the to-be-driven power of the motor, the to-be-charged power of the external battery, and the to-be-heated power of the motor coil, to cause the electrical energy of the AC power supply device to flow back to the AC power supply device after flowing through the first coil, the first bridge arm, and the bidirectional bridge arm; and in the fourth starting stage, the controller 104 controls the switch-on moments and durations of the first bridge arm, the second bridge arm, and the bidirectional bridge arm, to cause the electrical energy of the AC power supply device to flow through the bus capacitor 103 and flow back to the AC power supply device after flowing through the first coil, the first bridge arm, and the bidirectional bridge arm.

A starting period is further included before the working period of the drive-charging-heating circuit, and is used for charging the bus capacitor 103. The third starting stage is used for causing the AC power supply device to perform energy storage on the first coil, and the fourth starting stage causes the AC power supply device and the first coil to charge the bus capacitor 103, to ensure that a high voltage is formed on buses on two sides of the bus capacitor 103. When the working period starts, the bus capacitor 103 discharges to the motor coil through the bridge arm converter 102, and the bus capacitor 103 is charged by the AC power supply device and the first coil again, to enable the working period to work circularly.

Figure 15:
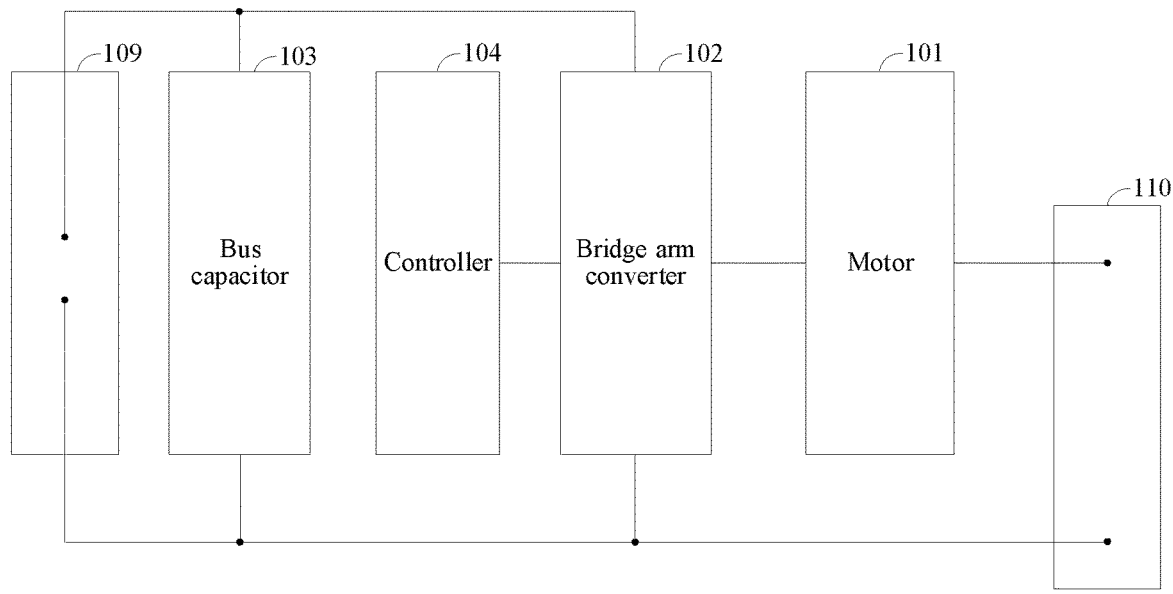
FIG. 15 is a schematic structural diagram of an energy conversion apparatus according to another embodiment of this application.

Embodiment 3 of this application provides an energy conversion apparatus 100, and as shown in FIG. 15, the energy conversion apparatus 100 includes:

a motor;

an in-vehicle charging module, including a charging connection end group 110, the charging connection end group 110 including a first charging connection end and a second charging connection end;

a motor control module, including a bridge arm converter 102, the bridge arm converter 102 being connected to a motor coil of the motor;

an energy storage module, including a bus capacitor 103 and an energy storage connection end group 109 connected in parallel, the bus capacitor 103 and the bridge arm converter 102 being connected in parallel, and the energy storage connection end group 109 including a first energy storage connection end and a second energy storage connection end; and a controller 104, connected to the bridge arm converter 102, where the motor coil, the bridge arm converter 102, and the bus capacitor 103 form a drive-charging circuit; and the controller 104 is configured to: according to to-be-driven power of the motor and to-be-charged power of an external battery, control the bridge arm converter 102 to cause external electrical energy to flow to the drive-charging circuit, and adjust a current of the drive-charging circuit, to cause the external electrical energy to drive the motor to output drive power and discharge outward through the drive-charging circuit at the same time.

Further, the first charging connection end and the second charging connection end are connected to an external power supply separately, and the external battery is connected to the first energy storage connection end and the second energy storage connection end separately; and the external power supply, the motor coil, the bridge arm converter 102, the bus capacitor 103, and the external battery form the drive-charging circuit.

Further, the controller 104 obtains a switch-on moment and duration of the bridge arm converter 102, and adjusts the current of the drive-charging circuit according to the switch-on moment and duration, to drive the motor to output drive power and charge the external battery at the same time through the drive-charging circuit.

Further, the external power supply is a direct current (DC) power supply device, and a working period of the drive-charging circuit includes a first working stage and a second working stage; and the motor coil includes a first coil and a second coil, and the bridge arm converter 102 includes a first bridge arm connected to the first coil and a second bridge arm connected to the second coil;

in the first working stage, the controller 104 controls switch-on moments and durations of the first bridge arm and the second bridge arm according to the to-be-driven power of the motor and the to-be-charged power of the external battery, to cause electrical energy of the DC power supply device to flow back to the DC power supply device after flowing through the first coil and the first bridge arm, and cause electrical energy on the bus capacitor 103 to flow back to the bus capacitor 103 after flowing through the second bridge arm, the second coil, the first coil, and the first bridge arm; and in the second working stage, the controller 104 controls the switch-on moments and durations of the first bridge arm and the second bridge arm, to cause the electrical energy of the DC power supply device to flow through the external battery and the bus capacitor 103 and flow back to the DC power supply device after flowing through the first coil and the first bridge arm, and the electrical energy forms a loop current among the second coil, the first coil, the first bridge arm, and the second bridge arm.

Further, in the second working stage, the controller 104 controls the switch-on moments and durations of the first bridge arm and the second bridge arm according to the to-be-charged power of the external battery, to cause the electrical energy of the DC power supply device to flow through the external battery and the bus capacitor 103 and flow back to the DC power supply device after flowing through the first coil and the first bridge arm, and the electrical energy forms a loop current among the second coil, the first coil, the first bridge arm, and the second bridge arm.

Further, a starting period of the drive-charging circuit is further included before the working period of the drive-charging circuit;

the starting period of the drive-charging circuit includes a first starting stage and a second starting stage;

in the first starting stage, the controller 104 controls the switch-on moments and durations of the first bridge arm and the second bridge arm according to the to-be-driven power of the motor and the to-be-charged power of the external battery, to cause the electrical energy of the DC power supply device to flow back to the DC power supply device after flowing through the first coil and the first bridge arm; and in the second starting stage, the controller 104 controls the switch-on moments and durations of the first bridge arm and the second bridge arm, to cause the electrical energy of the DC power supply device to flow through the bus capacitor 103 and flow back to the DC power supply device after flowing through the first coil and the first bridge arm.

Further, the energy conversion apparatus further includes a bidirectional bridge arm, the bidirectional bridge arm and the bridge arm converter 102 are connected in parallel, the charging connection end group further includes a third charging connection end, the bidirectional bridge arm is further connected to the controller 104 and the third charging connection end, the third charging connection end is connected to the external power supply, and the external power supply, the motor coil, the bridge arm converter 102, the bidirectional bridge arm, the bus capacitor 103, and the external battery form the drive-charging circuit; and the controller 104 obtains a switch-on moment and duration of the bridge arm converter 102, and adjusts the current of the drive-charging circuit according to the switch-on moment and duration, to drive the motor to output drive power and charge the external battery at the same time through the drive-charging circuit.

Further, the external power supply further includes an alternating current (AC) power supply device, the AC power supply device is connected to the bidirectional bridge arm, the working period of the drive-charging circuit includes a third working stage and a fourth working stage, the motor coil includes a first coil and a second coil, and the bridge arm converter 102 includes a first bridge arm connected to the first coil and a second bridge arm connected to the second coil;

in the third working stage, the controller 104 controls switch-on moments and durations of the first bridge arm, the second bridge arm, and the bidirectional bridge arm according to the to-be-driven power of the motor and the to-be-charged power of the external battery, to cause electrical energy of the AC power supply device to flow back to the AC power supply device after flowing through the first coil, the first bridge arm, and the bidirectional bridge arm, and cause electrical energy on the bus capacitor 103 to flow back to the bus capacitor 103 after flowing through the second bridge arm, the second coil, the first coil, and the first bridge arm; and in the fourth working stage, the controller 104 controls the switch-on moments and durations of the first bridge arm, the second bridge arm, and the bidirectional bridge arm, to cause the electrical energy of the AC power supply device to flow through the external battery and the bus capacitor 103 and flow back to the AC power supply device after flowing through the first coil, the first bridge arm, and the bidirectional bridge arm, and the electrical energy forms a loop current among the second coil, the first coil, the first bridge arm, and the second bridge arm.

Further, in the fourth working stage, the controller 104 controls the switch-on moments and durations of the first bridge arm and the second bridge arm according to the to-be-charged power of the external battery, to cause the electrical energy of the AC power supply device to flow through the bidirectional bridge arm and flow back to the AC power supply device after flowing through the first coil, the first bridge arm, the external battery, and the bus capacitor 103, and the electrical energy forms a loop current among the second coil, the first coil, the first bridge arm, and the second bridge arm.

Further, a starting period of the drive-charging circuit is further included before the working period of the drive-charging circuit;

the starting period of the drive-charging circuit includes a third starting stage and a fourth starting stage;

in the third starting stage, the controller 104 controls the switch-on moments and durations of the first bridge arm and the second bridge arm according to the to-be-driven power of the motor and the to-be-charged power of the external battery, to cause the electrical energy of the AC power supply device to flow back to the AC power supply device after flowing through the first coil, the first bridge arm, and the bidirectional bridge arm; and in the fourth starting stage, the controller 104 controls the switch-on moments and durations of the first bridge arm and the second bridge arm, to cause the electrical energy of the AC power supply device to flow back to the AC power supply device after flowing through the first coil, the first bridge arm, and the bus capacitor and then flowing through the bidirectional bridge arm.

In the fourth starting stage, the controller 104 controls the switch-on moments and durations of the first bridge arm, the second bridge arm, and the bidirectional bridge arm according to the to-be-charged power of the external battery, to cause the electrical energy of the AC power supply device to flow through the bus capacitor 103 and flow back to the AC power supply device after flowing through the first coil, the first bridge arm, and the bidirectional bridge arm.

Further, the external power supply, the motor coil, the bridge arm converter 102, the bus capacitor 103, and the external battery form a drive-charging-heating circuit; and when the charging connection end group is connected to the external power supply, according to the to-be-driven power of the motor, the to-be-charged power of the external battery, and to-be-heated power of the motor coil, the bridge arm converter 102 is controlled to cause electrical energy of the external power supply to flow to the drive-charging-heating circuit, and a current of the drive-charging-heating circuit is adjusted, to cause the external power supply to drive the motor to output drive power, charge the external battery, and cause the motor coil to produce heat through power consumption at the same time.

Further, the controller obtains a switch-on moment and duration of the bridge arm converter 102 and adjusts the current of the drive-charging-heating circuit according to the switch-on moment and duration.

Further, the external power supply is a DC power supply device, and a working period of the drive-charging-heating circuit includes a first working stage and a second working stage; and the motor coil includes a first coil and a second coil, and the bridge arm converter 102 includes a first bridge arm connected to the first coil and a second bridge arm connected to the second coil;

in the first working stage, the controller 104 controls switch-on moments and durations of the first bridge arm and the second bridge arm according to the to-be-driven power of the motor, the to-be-charged power of the external battery, and the to-be-heated power of the motor coil, to cause electrical energy of the DC power supply device to flow back to the DC power supply device after flowing through the first coil and the first bridge arm, and cause electrical energy on the bus capacitor 103 to flow back to the bus capacitor 103 after flowing through the second bridge arm, the second coil, the first coil, and the first bridge arm; and in the second working stage, the controller 104 controls the switch-on moments and durations of the first bridge arm and the second bridge arm, to cause the electrical energy of the DC power supply device to flow through the external battery and the bus capacitor 103 and flow back to the DC power supply device after flowing through the first coil and the first bridge arm, and the electrical energy forms a loop current among the second coil, the first coil, the first bridge arm, and the second bridge arm.

Further, a starting period of the drive-charging-heating circuit is further included before the working period of the drive-charging-heating circuit;

the starting period of the drive-charging-heating circuit includes a first starting stage and a second starting stage;

in the first starting stage, the controller 104 controls the switch-on moments and durations of the first bridge arm and the second bridge arm according to the to-be-driven power of the motor, the to-be-charged power of the external battery, and the to-be-heated power of the motor coil, to cause the electrical energy of the DC power supply device to flow back to the DC power supply device after flowing through the first coil and the first bridge arm; and in the second starting stage, the controller 104 controls the switch-on moments and durations of the first bridge arm and the second bridge arm, to cause the electrical energy of the DC power supply device to flow through the bus capacitor 103 and flow back to the DC power supply device after flowing through the first coil and the first bridge arm.

Further, the energy conversion apparatus further includes a bidirectional bridge arm, the bidirectional bridge arm and the bridge arm converter 102 are connected in parallel, the bidirectional bridge arm is further connected to the controller 104, the external power supply is an AC power supply device, the AC power supply device is connected to the bidirectional bridge arm, and the working period of the drive-charging-heating circuit includes a third working stage and a fourth working stage;

in the third working stage, the controller 104 controls switch-on moments and durations of the first bridge arm, the second bridge arm, and the bidirectional bridge arm according to the to-be-driven power of the motor, the to-be-charged power of the external battery, and the to-be-heated power of the motor coil, to cause electrical energy of the AC power supply device to flow back to the AC power supply device after flowing through the first coil, the first bridge arm, and the bidirectional bridge arm, and cause electrical energy on the bus capacitor 103 to flow back to the bus capacitor 103 after flowing through the second bridge arm, the second coil, the first coil, and the first bridge arm; and in the fourth working stage, the controller 104 controls the switch-on moments and durations of the first bridge arm, the second bridge arm, and the bidirectional bridge arm, to cause the electrical energy of the AC power supply device to flow back to the AC power supply device after flowing through the first coil, the first bridge arm, the external battery, and the bus capacitor 103 and flowing through the bidirectional bridge arm, and the electrical energy forms a loop current among the second coil, the first coil, the first bridge arm, and the second bridge arm.

Further, a starting period of the drive-charging-heating circuit is further included before the working period of the drive-charging-heating circuit;

the starting period of the drive-charging-heating circuit includes a third starting stage and a fourth starting stage;

in the third starting stage, the controller 104 controls the switch-on moments and durations of the first bridge arm, the second bridge arm, and the bidirectional bridge arm according to the to-be-driven power of the motor, the to-be-charged power of the external battery, and the to-be-heated power of the motor coil, to cause the electrical energy of the AC power supply device to flow back to the AC power supply device after flowing through the first coil, the first bridge arm, and the bidirectional bridge arm; and in the fourth starting stage, the controller 104 controls the switch-on moments and durations of the first bridge arm, the second bridge arm, and the bidirectional bridge arm, to cause the electrical energy of the AC power supply device to flow through the bus capacitor 103 and flow back to the AC power supply device after flowing through the first coil, the first bridge arm, and the bidirectional bridge arm.

In the fourth starting stage, the controller 104 controls the switch-on moments and durations of the first bridge arm, the second bridge arm, and the bidirectional bridge arm according to the to-be-charged power of the external battery, to cause the electrical energy of the AC power supply device to flow through the bus capacitor 103 and flow back to the AC power supply device after flowing through the first coil, the first bridge arm, and the bidirectional bridge arm.

Based on the above, the drive-charging circuit and drive-charging-heating circuit of the energy conversion apparatus 100 of the embodiments of the present disclosure control the switch-on moment and the switch-on duration of the bridge arm converter according to the to-be-driven power of the motor, the to-be-charged power of the external battery, and the to-be-heated power of the motor coil, and implement collaborative control over motor drive, battery charging, and heating of the motor coil to a to-be-heated device by reusing the motor coil of the motor.

Figure 16:
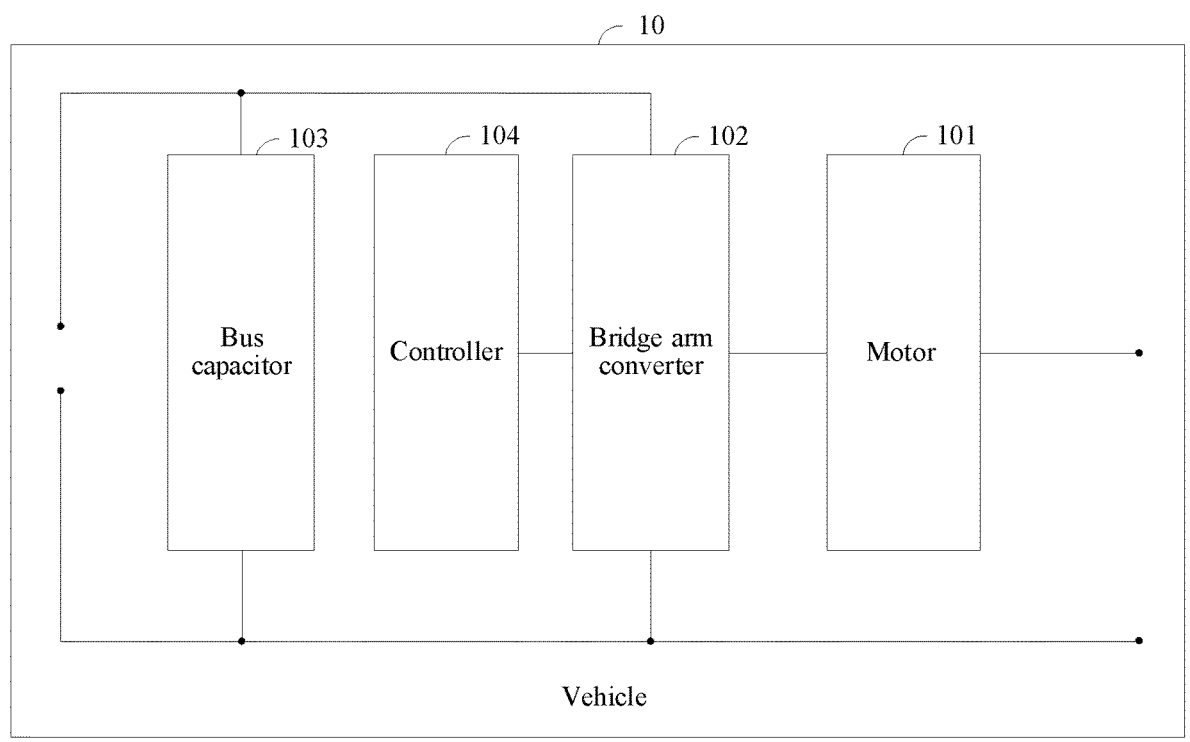
FIG. 16 is a schematic structural diagram of a vehicle according to another embodiment of this application.

Embodiment 4 of this application provides a vehicle 10, and as shown in FIG. 16, the vehicle further includes the energy conversion apparatus 100 of the foregoing embodiments.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In addition, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the descriptions of this application, "a plurality of" means two or more, unless otherwise defined clearly and specifically.

In this application, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; a direct connection, an indirect connection through an intermediate, or internal communication between two components or an interaction relationship between two components. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediate. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, schematic descriptions of the foregoing terms are not necessarily directed at the same embodiment or example. Besides, the specific features, the structures, the materials, or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of this application are shown and described above, it may be understood that the foregoing embodiments are exemplary, and cannot be understood as a limitation to this application. A person of ordinary skill in the art may make changes, modifications, replacements, and variations to the foregoing embodiments without departing from the scope of this application.

What is claimed is:

1. An energy conversion apparatus, comprising a motor coil of a motor, a bridge arm converter, a bus capacitor connected to the bridge arm converter in parallel, and a controller connected to the bridge arm converter, wherein
  the bridge arm converter is connected to the motor coil;
  the motor coil, the bus capacitor, and the bridge arm converter are connected to an external charging port, and the bus capacitor is connected to an external battery in parallel;
  a drive-charging circuit comprises the external charging port, the motor coil, the bridge arm converter, the bus capacitor, and the external battery; and
  the controller is configured to:
    obtain a switch-on moment and duration of the bridge arm converter according to to-be-driven power of the motor and to-be-charged power of the external battery; and
    when the energy conversion apparatus is connected to an external power supply through the external charging port, control the switch-on moment and duration of the bridge arm converter according to the to-be-driven power of the motor and the to-be-charged power of the external battery to cause electrical energy of the external power supply to flow to the drive-charging circuit, and adjust a current of the drive-charging circuit according to the switch-on moment and duration of the bridge arm converter to cause the external power supply to drive the motor to output drive power and charge the external battery simultaneously.

2. The energy conversion apparatus according to claim 1, wherein
  the external charging port comprises a direct current (DC) charging port, the external power supply comprises a DC power supply device, a working period of the drive-charging circuit comprises a first working stage and a second working stage, the motor coil comprises a first coil and a second coil, and the bridge arm converter comprises a first bridge arm connected to the first coil and a second bridge arm connected to the second coil;
  in the first working stage, the controller controls a switch-on moment and duration of the first bridge arm and a switch-on moment and duration of the second bridge arm according to the to-be-driven power of the motor and the to-be-charged power of the external battery, to cause electrical energy of the DC power supply device to flow back to the DC power supply device after flowing through the first coil and the first bridge arm, and cause electrical energy of the bus capacitor to flow back to the bus capacitor after flowing through the second bridge arm, the second coil, the first coil, and the first bridge arm; and
  in the second working stage, the controller controls the switch-on moment and duration of the first bridge arm and the switch-on moment and duration of the second bridge arm according to the to-be-charged power of the external battery, to cause the electrical energy of the DC power supply device to flow through the external battery and the bus capacitor and flow back to the DC power supply device after flowing through the first coil and the first bridge arm, and a current loop is formed among the second coil, the first coil, the first bridge arm, and the second bridge arm.

3. The energy conversion apparatus according to claim 2, wherein
  the drive-charging circuit is further operated at a starting period before the working period of the drive-charging circuit;
  the starting period of the drive-charging circuit comprises a first starting stage and a second starting stage;
  in the first starting stage, the controller controls the switch-on moment and duration of the first bridge arm and the switch-on moment and duration of the second bridge arm according to the to-be-driven power of the motor and the to-be-charged power of the external battery, to cause the electrical energy of the DC power supply device to flow back to the DC power supply device after flowing through the first coil and the first bridge arm; and
  in the second starting stage, the controller controls the switch-on moment and duration of the first bridge arm and the switch-on moment and duration of the second bridge arm, to cause the electrical energy of the DC power supply device to flow through the bus capacitor and flow back to the DC power supply device after flowing through the first coil and the first bridge arm.

4. The energy conversion apparatus according to claim 1, further comprising a bidirectional bridge arm, wherein the external charging port further comprises an alternating current (AC) charging port, the bidirectional bridge arm and the bridge arm converter are connected in parallel, the bidirectional bridge arm is further connected to the controller and the AC charging port, the AC charging port is connected to an AC power supply device, and a working period of the drive-charging circuit comprises a third working stage and a fourth working stage;
  the motor coil comprises a first coil and a second coil, and the bridge arm converter comprises a first bridge arm connected to the first coil and a second bridge arm connected to the second coil;
  in the third working stage, the controller controls a switch-on moment and duration of the first bridge arm, a switch-on moment and duration of the second bridge arm, and a switch-on moment and duration of the bidirectional bridge arm according to the to-be-driven power of the motor and the to-be-charged power of the external battery, to cause electrical energy of the AC power supply device to flow back to the AC power supply device after flowing through the first coil, the first bridge arm, and the bidirectional bridge arm, and cause electrical energy of the bus capacitor to flow back to the bus capacitor after flowing through the second bridge arm, the second coil, the first coil, and the first bridge arm; and
  in the fourth working stage, the controller controls the switch-on moment and duration of the first bridge arm and the switch-on moment and duration of the second bridge arm according to the to-be-charged power of the external battery, to cause the electrical energy of the AC power supply device to flow through the external battery and the bus capacitor and flow back to the AC power supply device after flowing through the first coil, the first bridge arm, and the bidirectional bridge arm, and a current loop is formed among the second coil, the first coil, the first bridge arm, and the second bridge arm.

5. The energy conversion apparatus according to claim 4, wherein
  the drive-charging circuit is further operated at a starting period before the working period of the drive-charging circuit;
  the starting period of the drive-charging circuit comprises a third starting stage and a fourth starting stage;
  in the third starting stage, the controller controls the switch-on moment and duration of the first bridge arm, the switch-on moment and duration of the second bridge arm, and the switch-on moment and duration of the bidirectional bridge arm according to the to-be-driven power of the motor and the to-be-charged power of the external battery, to cause the electrical energy of the AC power supply device to flow back to the AC power supply device after flowing through the first coil, the first bridge arm, and the bidirectional bridge arm; and in the fourth starting stage, the controller controls the switch-on moment and duration of the first bridge arm, the switch-on moment and duration of the second bridge arm, and the switch-on moment and duration of the bidirectional bridge arm, to cause the electrical energy of the AC power supply device to flow back to the AC power supply device after flowing through the first coil, the first bridge arm, and the bus capacitor and then flowing through the bidirectional bridge arm.

6. The energy conversion apparatus according to claim 1, wherein the drive-charging circuit is also a drive-charging-heating circuit;

when the external charging port is connected to the external power supply, according to the to-be-driven power of the motor, the to-be-charged power of the external battery, and to-be-heated power of the motor coil, the bridge arm converter is controlled to cause the electrical energy of the external power supply to flow to a drive-charging-heating circuit, and a current of the drive-charging-heating circuit is adjusted, to cause the external power supply to drive the motor to output drive power, charge the external battery, and cause the motor coil to produce heat through power consumption at the same time; and the controller obtains the switch-on moment and duration of the bridge arm converter according to the to-be-driven power of the motor, the to-be-charged power of the external battery, and the to-be-heated power of the motor coil, and adjusts the current of the drive-charging-heating circuit according to the switch-on moment and duration of the bridge arm converter.

7. The energy conversion apparatus according to claim 6, wherein the external charging port comprises a DC charging port, the external power supply comprises a DC power supply device, and a working period of the drive-charging-heating circuit comprises a first working stage and a second working stage; and the motor coil comprises a first coil and a second coil, and the bridge arm converter comprises a first bridge arm connected to the first coil and a second bridge arm connected to the second coil;

in the first working stage, the controller controls a switch-on moment and duration of the first bridge arm and a switch-on moment and duration of the second bridge arm according to the to-be-driven power of the motor, the to-be-charged power of the external battery, and the to-be-heated power of the motor coil, to cause electrical energy of the DC power supply device to flow back to the DC power supply device after flowing through the first coil and the first bridge arm, and cause electrical energy of the bus capacitor to flow back to the bus capacitor after flowing through the second bridge arm, the second coil, the first coil, and the first bridge arm; and in the second working stage, the controller controls the switch-on moment and duration of the first bridge arm and the switch-on moment and duration of the second bridge arm according to the to-be-charged power of the external battery, to cause the electrical energy of the DC power supply device to flow through the external battery and the bus capacitor and flow back to the DC power supply device after flowing through the first coil and the first bridge arm, and a current loop is formed among the second coil, the first coil, the first bridge arm, and the second bridge arm.

8. The energy conversion apparatus according to claim 6, further comprising a bidirectional bridge arm, wherein the external charging port further comprises an AC charging port, the bidirectional bridge arm and the bridge arm converter are connected in parallel, the bidirectional bridge arm is further connected to the controller and the AC charging port, the AC charging port is connected to an AC power supply device, and a working period of the drive-charging-heating circuit comprises a third working stage and a fourth working stage; and the motor coil comprises a first coil and a second coil, and the bridge arm converter comprises a first bridge arm connected to the first coil and a second bridge arm connected to the second coil;

in the third working stage, the controller controls a switch-on moment and duration of the first bridge arm, a switch-on moment and duration of the second bridge arm, and a switch-on moment and duration of the bidirectional bridge arm according to the to-be-driven power of the motor, the to-be-charged power of the external battery, and the to-be-heated power of the motor coil, to cause electrical energy of the AC power supply device to flow back to the AC power supply device after flowing through the first coil, the first bridge arm, and the bidirectional bridge arm, and cause electrical energy of the bus capacitor to flow back to the bus capacitor after flowing through the second bridge arm, the second coil, the first coil, and the first bridge arm; and in the fourth working stage, the controller controls the switch-on moment and duration of the first bridge arm and the switch-on moment and duration of the second bridge arm according to the to-be-charged power of the external battery, to cause the electrical energy of the AC power supply device to flow back to the AC power supply device after flowing through the first coil, the first bridge arm, the external battery, the bus capacitor, and the bidirectional bridge arm, and a current loop is formed among the second coil, the first coil, the first bridge arm, and the second bridge arm.

9. An energy conversion apparatus, comprising:
a motor;
an in-vehicle charger, comprising a charging connection end group, the charging connection end group comprising a first charging connection end and a second charging connection end;
a motor controller, comprising a bridge arm converter, the bridge arm converter being connected to a motor coil of the motor;
an energy storage, comprising a bus capacitor and an energy storage connection end group connected in parallel, the bus capacitor and the bridge arm converter being connected in parallel, and the energy storage connection end group comprising a first energy storage connection end and a second energy storage connection end; and
a controller, connected to the bridge arm converter, wherein
a drive-charging circuit comprises the motor coil, the bridge arm converter, and the bus capacitor; and the controller is configured to:
obtain a switch-on moment and duration of the bridge arm converter according to to-be-driven power of the motor and to-be-charged power of an external battery; and
control the switch-on moment and duration of the bridge arm converter according to the to-be-driven power of the motor and the to-be-charged power of the external battery, to cause external electrical energy to flow to the drive-charging circuit, and adjust a current of the drive-charging circuit according to the switch-on moment and duration of the bridge arm converter, to cause the external electrical energy to drive the motor to output drive power and discharge externally simultaneously.

10. The energy conversion apparatus according to claim 9, wherein the first charging connection end and the second charging connection end are connected to an external power supply, and the external battery is connected to the first energy storage connection end and the second energy storage connection end; and
wherein the drive-charging circuit further comprises the external power supply and the external battery.

11. The energy conversion apparatus according to claim 10, wherein the external power supply comprises a direct current (DC) power supply device, and a working period of the drive-charging circuit comprises a first working stage and a second working stage; and the motor coil comprises a first coil and a second coil, and the bridge arm converter comprises a first bridge arm connected to the first coil and a second bridge arm connected to the second coil;
in the first working stage, the controller controls a switch-on moment and duration of the first bridge arm and a switch-on moment and duration of the second bridge arm according to the to-be-driven power of the motor and the to-be-charged power of the external battery, to cause electrical energy of the DC power supply device to flow back to the DC power supply device after flowing through the first coil and the first bridge arm, and cause electrical energy of the bus capacitor to flow back to the bus capacitor after flowing through the second bridge arm, the second coil, the first coil, and the first bridge arm; and
in the second working stage, the controller controls the switch-on moment and duration of the first bridge arm and the switch-on moment and duration of the second bridge arm, to cause the electrical energy of the DC power supply device to flow through the external battery and the bus capacitor and flow back to the DC power supply device after flowing through the first coil and the first bridge arm, and a current loop is formed among the second coil, the first coil, the first bridge arm, and the second bridge arm.

12. The energy conversion apparatus according to claim 10, further comprising a bidirectional bridge arm, wherein the bidirectional bridge arm and the bridge arm converter are connected in parallel, the charging connection end group further comprises a third charging connection end, the bidirectional bridge arm is further connected to the controller and the third charging connection end, the third charging connection end is connected to the external power supply, and the drive-charging circuit; and
the controller adjusts the current of the drive-charging circuit according to the switch-on moment and duration of the bridge arm converter, to drive the motor to output drive power and charge the external battery simultaneously.

13. The energy conversion apparatus according to claim 12, wherein the external power supply comprises an alternating current (AC) power supply device, the AC power supply device is connected to the bidirectional bridge arm, and a working period of the drive-charging circuit comprises a third working stage and a fourth working stage; and the motor coil comprises a first coil and a second coil, and the bridge arm converter comprises a first bridge arm connected to the first coil and a second bridge arm connected to the second coil;
in the third working stage, the controller controls a switch-on moment and duration of the first bridge arm, a switch-on moment and duration of the second bridge arm, and a switch-on moment and duration of the bidirectional bridge arm according to the to-be-driven power of the motor and the to-be-charged power of the external battery, to cause electrical energy of the AC power supply device to flow back to the AC power supply device after flowing through the first coil, the first bridge arm, and the bidirectional bridge arm, and cause electrical energy of the bus capacitor to flow back to the bus capacitor after flowing through the second bridge arm, the second coil, the first coil, and the first bridge arm; and
in the fourth working stage, the controller controls the switch-on moment and duration of the first bridge arm, the switch-on moment and duration of the second bridge arm, and the switch-on moment and duration of the bidirectional bridge arm, to cause the electrical energy of the AC power supply device to flow back to the AC power supply device after flowing through the first coil, the first bridge arm, the external battery, the bus capacitor, and the bidirectional bridge arm, and a current loop is formed among the second coil, the first coil, the first bridge arm, and the second bridge arm.

14. The energy conversion apparatus according to claim 10, wherein the drive-charging circuit is also a drive-charging-heating circuit; and
when the charging connection end group is connected to the external power supply, according to the to-be-driven power of the motor, the to-be-charged power of the external battery, and to-be-heated power of the motor coil, the bridge arm converter is controlled to cause electrical energy of the external power supply to flow to a drive-charging-heating circuit, and a current of the drive-charging-heating circuit is adjusted, to cause the external power supply to drive the motor to output drive power, charge the external battery, and cause the motor coil to produce heat through power consumption at the same time.

15. The energy conversion apparatus according to claim 14, wherein the controller obtains a switch-on moment and duration of the bridge arm converter according to the to-be-driven power of the motor, the to-be-charged power of the external battery, and the to-be-heated power of the motor coil, and adjusts the current of the drive-charging-heating circuit according to the switch-on moment and duration of the bridge arm converter.

16. The energy conversion apparatus according to claim 15, wherein the external power supply comprises a DC power supply device, and a working period of the drive-charging-heating circuit comprises a first working stage and a second working stage; and the motor coil comprises a first coil and a second coil, and the bridge arm converter comprises a first bridge arm connected to the first coil and a second bridge arm connected to the second coil;

in the first working stage, the controller controls a switch-on moment and duration of the first bridge arm and a switch-on moment and duration of the second bridge arm according to the to-be-driven power of the motor, the to-be-charged power of the external battery, and the to-be-heated power of the motor coil, to cause electrical energy of the DC power supply device to flow back to the DC power supply device after flowing through the first coil and the first bridge arm, and cause electrical energy of the bus capacitor to flow back to the bus capacitor after flowing through the second bridge arm, the second coil, the first coil, and the first bridge arm; and in the second working stage, the controller controls the switch-on moment and duration of the first bridge arm and the switch-on moment and duration of the second bridge arm, to cause the electrical energy of the DC power supply device to flow through the external battery and the bus capacitor and flow back to the DC power supply device after flowing through the first coil and the first bridge arm, and a current loop is formed among the second coil, the first coil, the first bridge arm, and the second bridge arm.

17. The energy conversion apparatus according to claim 14, further comprising a bidirectional bridge arm, wherein the bidirectional bridge arm and the bridge arm converter are connected in parallel, the bidirectional bridge arm is further connected to the controller, the external power supply comprises an AC power supply device, the AC power supply device is connected to the bidirectional bridge arm, and a working period of the drive-charging-heating circuit comprises a third working stage and a fourth working stage; and the motor coil comprises a first coil and a second coil, and the bridge arm converter comprises a first bridge arm connected to the first coil and a second bridge arm connected to the second coil;

in the third working stage, the controller controls a switch-on moment and duration of the first bridge arm, a switch-on moment and duration of the second bridge arm, and the switch-on moment and duration of the bidirectional bridge arm according to the to-be-driven power of the motor, the to-be-charged power of the external battery, and the to-be-heated power of the motor coil, to cause electrical energy of the AC power supply device to flow back to the AC power supply device after flowing through the first coil, the first bridge arm, and the bidirectional bridge arm, and cause electrical energy of the bus capacitor to flow back to the bus capacitor after flowing through the second bridge arm, the second coil, the first coil, and the first bridge arm; and in the fourth working stage, the controller controls the switch-on moment and duration of the first bridge arm, the switch-on moment and duration of the second bridge arm, and the switch-on moment and duration of the bidirectional bridge arm, to cause the electrical energy of the AC power supply device to flow back to the AC power supply device after flowing through the first coil, the first bridge arm, the external battery, the bus capacitor, and the bidirectional bridge arm, and a current loop is formed among the second coil, the first coil, the first bridge arm, and the second bridge arm.

18. A vehicle, comprising an energy conversion apparatus comprising a motor coil of a motor, a bridge arm converter, a bus capacitor connected to the bridge arm converter in parallel, and a controller connected to the bridge arm converter, wherein the bridge arm converter is connected to the motor coil;
the motor coil, the bus capacitor, and the bridge arm converter are connected to an external charging port, and the bus capacitor is connected to an external battery in parallel;
a drive-charging circuit comprises the external charging port, the motor coil, the bridge arm converter, the bus capacitor, and the external battery; and
the controller is configured to:
 obtain a switch-on moment and duration of the bridge arm converter according to to-be-driven power of the motor and to-be-charged power of the external battery; and
 when the energy conversion apparatus is connected to an external power supply through the external charging port, control the switch-on moment and duration of the bridge arm converter according to the to-be-driven power of the motor and the to-be-charged power of the external battery to cause electrical energy of the external power supply to flow to the drive-charging circuit, and adjust a current of the drive-charging circuit according to the switch-on moment and duration of the bridge arm converter to cause the external power supply to drive the motor to output drive power and charge the external battery simultaneously.

\* \* \* \* \*